United States Patent
Koyama

(10) Patent No.: US 11,671,552 B2
(45) Date of Patent: Jun. 6, 2023

(54) IMAGING SYSTEM

(71) Applicant: OLYMPUS CORPORATION, Hachioji (JP)

(72) Inventor: Yusaku Koyama, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 17/702,864

(22) Filed: Mar. 24, 2022

(65) Prior Publication Data
US 2022/0217249 A1 Jul. 7, 2022

Related U.S. Application Data

(63) Continuation of application No. PCT/JP2019/038219, filed on Sep. 27, 2019.

(51) Int. Cl.
*H04N 5/067* (2006.01)
*H04N 13/296* (2018.01)
*H04N 23/66* (2023.01)
*H04N 23/50* (2023.01)

(52) U.S. Cl.
CPC .......... *H04N 5/067* (2013.01); *H04N 13/296* (2018.05); *H04N 23/66* (2023.01); *H04N 23/555* (2023.01)

(58) Field of Classification Search
CPC ...... H04N 5/067; H04N 13/296; H04N 23/66; H04N 23/555; H04N 23/60; H04N 7/18; H04N 21/637
USPC .......................................................... 348/500
See application file for complete search history.

(56) References Cited

U.S. PATENT DOCUMENTS

| | | | | |
|---|---|---|---|---|
| 4,884,134 A * | 11/1989 | Tsuji | ...................... | H04N 23/74 386/326 |
| 5,913,817 A * | 6/1999 | Lee | ......................... | H04N 25/75 348/E5.079 |
| 6,468,201 B1 * | 10/2002 | Burdick | .................... | H03F 3/19 600/109 |
| 6,753,905 B1 * | 6/2004 | Okada | .................... | H04N 23/66 348/45 |

(Continued)

FOREIGN PATENT DOCUMENTS

| | | | | |
|---|---|---|---|---|
| CN | 102481140 A * | 5/2012 | ............... | A61B 8/56 |
| JP | 3039965 B2 * | 5/2000 | ............... | A61B 8/56 |

(Continued)

OTHER PUBLICATIONS

International Search Report dated Dec. 17, 2019, issued in counterpart application No. PCT/JP2019/038219, w/English translation (2 pages).

*Primary Examiner* — Michael Lee
(74) *Attorney, Agent, or Firm* — WHDA, LLP

(57) ABSTRACT

An imaging system includes a camera unit and a control unit. A control signal transmission circuit of the control unit is configured to set a bias potential of a signal line to one of two or more different potentials at a timing that is set on the basis of a first video synchronization signal so as to output a control signal indicating an imaging condition of an image sensor to the signal line. A signal-processing circuit of the camera unit is configured to receive the control signal and determine the imaging condition from the control signal by determining the bias potential at a timing that is set on the basis of a second video synchronization signal.

11 Claims, 13 Drawing Sheets

(56) References Cited

U.S. PATENT DOCUMENTS

| | | | |
|---|---|---|---|
| 7,365,768 B1* | 4/2008 | Ono | H04N 23/661 |
| | | | 600/101 |
| 2004/0073086 A1* | 4/2004 | Abe | H04N 23/65 |
| | | | 600/109 |
| 2007/0230075 A1* | 10/2007 | Murata | G02B 23/2492 |
| | | | 361/58 |
| 2008/0177137 A1 | 7/2008 | Matsui | |
| 2009/0072151 A1* | 3/2009 | Zhang | A61B 6/037 |
| | | | 250/363.03 |
| 2010/0269137 A1* | 10/2010 | Nakajima | H04N 1/00299 |
| | | | 725/39 |
| 2020/0119718 A1* | 4/2020 | He | G01R 19/1659 |
| 2022/0217249 A1* | 7/2022 | Koyama | H04N 23/66 |

FOREIGN PATENT DOCUMENTS

| | | | |
|---|---|---|---|
| JP | 2000350194 A | * | 12/2000 |
| JP | 2008-068021 A | | 3/2008 |
| JP | 2009-135726 A | | 6/2009 |
| JP | 2013-248135 A | | 12/2013 |
| JP | 2018-192086 A | | 12/2018 |

* cited by examiner

IMAGING SYSTEM

The present application is a continuation application based on International Patent Application No. PCT/JP2019/038219 filed on Sep. 27, 2019, the content of which is incorporated herein by reference.

BACKGROUND OF THE INVENTION

Field of the Invention

The present invention relates to an imaging system.

Description of Related Art

Complementary metal-oxide-semiconductor (CMOS) image sensors as solid-state imaging devices have attracted attention and have been put to practical use in recent years. While charge-coupled-device (CCD) image sensors are manufactured by using dedicated manufacturing processes, the CMOS image sensors are manufactured by using general manufacturing processes. Therefore, multifunctional CMOS image sensors can be realized by incorporating various functional circuits such as AD conversion circuits or image-processing circuits into the CMOS image sensors.

An endoscopic imaging system is expected to be multifunctional by adopting a CMOS image sensor as an image sensor of the endoscopic imaging system. In a case in which the CMOS image sensor is used in the endoscopic imaging system, a mechanism (communication means) for controlling operations of the CMOS image sensor is required. Specifically, the CMOS image sensor includes a driving signal generation circuit including a built-in resistor, and the functions of the CMOS image sensor are controlled in accordance with data recorded on the resistor. Data are transmitted from a circuit in a main body to the CMOS image sensor by using a communication means, and the data on the resistor are updated. In this way, the functions of the CMOS image sensor can be controlled from the circuit in the main body.

Endoscopes are used in both medical and industrial fields. There is a demand in medical fields for less-invasive medicine to be promoted. There is a demand in industrial fields for narrower portions to be inspected. For these reasons, reducing the thickness of endoscopes is important.

The challenges are to miniaturize an image sensor, reduce the number of components used at a distal end part of a scope, and reduce the number of cables connected to an image sensor in order to reduce the thickness of endoscopes.

A technique of improving the manufacturing processes of CMOS image sensors has been developed. In addition, a technique of forming a chip by arranging circuits other than pixels in a plurality of substrates stacked on each other has been developed. Therefore, CMOS image sensors are considered to be better than CCD image sensors in terms of miniaturizing image sensors.

In a CCD image sensor equipped with analog output, a driving circuit for outputting an analog signal to a thin cable is required. In order to use the CCD image sensor equipped with digital output, an AD conversion circuit disposed in a different chip from that including the CCD image sensor is required. On the other hand, it is possible to incorporate a functional circuit such as the driving circuit and the AD conversion circuit into the CMOS image sensor. Therefore, the number of components used at a distal end part can be reduced in the CMOS image sensor.

Considering the number of power sources and the number of control signals, the CMOS image sensor is advantageous even in terms of the number of cables. Since the number of pads connected to cables is a major factor that determines the chip size of the image sensor, the size of the image sensor depends on the number of cables. The image sensor can be miniaturized by reducing the number of cables.

FIG. 12 shows an example of a configuration of an endoscopic imaging system including a CMOS image sensor. An endoscopic imaging system 1001 shown in FIG. 12 includes a camera unit 1010 and a control unit 1060. The camera unit 1010 is disposed in a distal end part of an endoscope. The control unit 1060 is a main body.

The camera unit 1010 includes an image sensor 1100. The image sensor 1100 includes a pixel unit 1101, an AD conversion circuit (ADC) 1102, a video signal transmission circuit 1103, an I2C reception circuit 1104, a clock reception circuit 1105, and a timing generator (TG) 1106. The control unit 1060 includes a power source unit 1600, a video signal reception circuit 1601, an I2C transmission circuit 1602, and a clock transmission circuit 1603. The camera unit 1010 and the control unit 1060 are connected to each other by a plurality of cables (signal lines).

The power source unit 1600 outputs a power source voltage VDD to a cable 1300 and outputs a ground voltage GND to a cable 1301. The cable 1300 transmits the power source voltage VDD to the image sensor 1100, and the cable 1301 transmits the ground voltage GND to the image sensor 1100.

The pixel unit 1101 includes a plurality of pixels disposed in a matrix shape. The pixel unit 1101 generates a pixel signal. The ADC 1102 converts the analog pixel signal into a digital video signal. The video signal transmission circuit 1103 transmits the video signal to the control unit 1060 by outputting the video signal to a cable 1302 and a cable 1303. The video signal is transmitted as a differential signal. The cable 1302 and the cable 1303 transmit the video signal to the control unit 1060. The video signal reception circuit 1601 receives the video signal transmitted by the video signal transmission circuit 1103.

The TG 1106 generates a video synchronization signal including a horizontal synchronization signal and a vertical synchronization signal. The TG 1106 outputs the video synchronization signal to the pixel unit 1101, the ADC 1102, and the video signal transmission circuit 1103. The TG 1106 includes a resistor 1107. The resistor 1107 stores data indicating timings of the video synchronization signal. The TG 1106 generates the video synchronization signal on the basis of the data stored on the resistor 1107.

The endoscopic imaging system 1001 uses inter-integrated circuit communication (I2C) for communication of the data to be stored on the resistor 1107. The I2C transmission circuit 1602 outputs a serial clock (SCL) to a cable 1304 and outputs serial data (SDA) to a cable 1305. In this way, the I2C transmission circuit 1602 transmits the SCL and the SDA to the image sensor 1100. The cable 1304 transmits the SCL to the image sensor 1100, and the cable 1305 transmits the SDA to the image sensor 1100.

The I2C reception circuit 1104 receives the SCL and the SDA transmitted by the I2C transmission circuit 1602. The I2C reception circuit 1104 generates data on the basis of the potential of each of the SCL and the SDA. The resistor 1107 stores the data generated by the I2C reception circuit 1104.

The clock transmission circuit 1603 transmits a clock signal to the image sensor 1100 by outputting the clock signal to a cable 1306 and a cable 1307. The clock signal is transmitted as a differential signal. The cable 1306 and the cable 1307 transmit the clock signal to the image sensor 1100. The clock reception circuit 1105 receives the clock signal transmitted by the clock transmission circuit 1603. The clock signal is a reference signal used for driving the image sensor 1100.

An example of data transmission using the I2C communication will be described. FIG. 13 shows waveforms of the SCL and the SDA. The horizontal direction in FIG. 13 indicates time, and the vertical direction in FIG. 13 indicates a potential (electric potential) of signals. The SCL is a signal having a low frequency. For example, the frequency of the SCL ranges from several tens of kHz to several hundreds of kHz.

The potential of each of the SCL and the SDA is any one of "High" (H) and "Low" (L). If the edge of the SDA is determined while the potential of the SCL is "High," a start condition or a stop condition is met. In the example shown in FIG. 13, the potential of the SCL is "High" in a period T100, and the potential of the SDA changes from "Low" to "High" in the period T100. In the example shown in FIG. 13, the potential of the SCL is "High" in a period T101, and the potential of the SDA changes from "Low" to "High" in the period T101. Accordingly, the start condition is met in the period T100 and the stop condition is met in the period T101.

Data are determined on the basis of the potential of the SDA between the timing at which the start condition is met and the timing at which the stop condition is met. In the example shown in FIG. 13, the potential of the SCL is "High," and the potential of the SDA is "Low" in a period T102. In the example shown in FIG. 13, the potential of the SCL is "High," and the potential of the SDA is "High" in a period T103. Accordingly, the data, which are the combination of "High" and "Low," are transmitted from the control unit 1060 to the image sensor 1100.

The endoscopic imaging system 1001 includes the two cables 1300 and 1301 used for transmitting the power source voltage VDD and the ground voltage GND. The endoscopic imaging system 1001 includes the two cables 1302 and 1303 used for transmitting the video signal. The endoscopic imaging system 1001 includes the two cables 1304 and 1305 used for transmitting the SCL and the SDA. The endoscopic imaging system 1001 includes the two cables 1306 and 1307 used for transmitting the clock signal. Accordingly, the endoscopic imaging system 1001 includes eight cables. In order to further reduce the diameter of the scope, the number of cables needs to be further reduced.

A system including a transmitter that transmits a video signal and a receiver that receives the video signal is disclosed in Japanese Unexamined Patent Application, First Publication No. 2009-135726. In FIG. 34 of Japanese Unexamined Patent Application, First Publication No. 2009-135726, a system that transmits each of the SCL and the SDA as a differential signal is shown. In this system, the receiver determines communication standards of the transmitter on the basis of the DC bias potential of the differential signal. In addition, the transmitter determines a connection state of the receiver on the basis of the DC bias potential of the differential signal.

SUMMARY OF THE INVENTION

According to a first aspect of the present invention, an imaging system includes a camera unit including an image sensor and includes a control unit connected to the camera unit by a signal line. The control unit is configured to generate a first video synchronization signal. The camera unit is configured to generate a second video synchronization signal that is synchronized with the first video synchronization signal and indicates a timing at which a video signal is output from the image sensor. The control unit includes a video signal reception circuit and a control signal transmission circuit. The video signal reception circuit is configured to receive the video signal superimposed on a bias potential of the signal line. The control signal transmission circuit is configured to set the bias potential to one of two or more different potentials at a timing that is set on the basis of the first video synchronization signal so as to output a control signal indicating an imaging condition of the image sensor to the signal line. The camera unit includes a signal-processing circuit, a register, and the image sensor. The signal-processing circuit is configured to receive the control signal output to the signal line and determine the imaging condition from the control signal by determining the bias potential at a timing that is set on the basis of the second video synchronization signal. The register is configured to store the imaging condition determined by the signal-processing circuit. The image sensor is configured to perform imaging in accordance with the imaging condition stored on the register and output the video signal to the signal line.

According to a second aspect of the present invention, in the first aspect, the video signal may be a differential signal including a first video signal and a second video signal different from each other. The signal line may include a first signal line used for transmitting the first video signal and a second signal line used for transmitting the second video signal.

According to a third aspect of the present invention, in the second aspect, the control signal transmission circuit may be configured to output a first potential included in the two or more potentials to the first signal line and output a second potential that is included in the two or more potentials and has the same phase as the phase of the first potential to the second signal line so as to output the control signal to the signal line. The signal-processing circuit may be configured to determine the imaging condition from the control signal by determining at least one of the first potential and the second potential.

According to a fourth aspect of the present invention, in the second aspect, the control signal transmission circuit may be configured to output a first potential included in the two or more potentials to the first signal line and output a second potential that is included in the two or more potentials and has a reverse phase to a phase of the first potential to the second signal line so as to output the control signal to the signal line. The signal-processing circuit may be configured to determine the imaging condition from the control signal by determining the first potential and the second potential.

According to a fifth aspect of the present invention, in the fourth aspect, the control signal transmission circuit may be electrically connected to a first node of the signal line. The video signal reception circuit may be electrically connected to a second node of the signal line. The first node and the second node may be different from each other. The first node may be positioned between the camera unit and the second node. The video signal has components having potentials that change at a higher frequency than a frequency at which the bias potential changes. The control unit may further include a high-pass filter. The high-pass filter may be electrically connected to the signal line between the first node and the second node. The high-pass filter may be configured to output a signal that has components of the video signal and does not have components of the bias potential to the video signal reception circuit.

According to a sixth aspect of the present invention, in any one of the first to fifth aspects, the control signal transmission circuit may be configured to set the bias potential to one of the two or more potentials in a blanking period of the first video synchronization signal.

According to a seventh aspect of the present invention, in any one of the first to sixth aspects, the video signal may have components having potentials that change at a higher frequency than a frequency at which the bias potential changes. The camera unit may further include a low-pass filter. The low-pass filter may be electrically connected to the signal line. The low-pass filter may be configured to output a signal that has components of the bias potential and does not have components of the video signal to the signal-processing circuit.

According to an eighth aspect of the present invention, in any one of the first to seventh aspects, the control signal transmission circuit may be configured to change the bias potential to one of a high level and a low level included in the two or more potentials in a first period that is set on the basis of the first video synchronization signal so as to output a start signal indicating a start timing of the control signal to the signal line. The signal-processing circuit may be configured to determine the start signal by determining a change of the bias potential in the first period. After the start signal is output to the signal line, the control signal transmission circuit may be configured to set the bias potential to one of the high level and the low level in one or more second periods that are set on the basis of the first video synchronization signal so as to output the control signal to the signal line. The signal-processing circuit may be configured to determine the imaging condition from the control signal by determining the bias potential in a third period that is set on the basis of the second video synchronization signal. After the control signal is output to the signal line, the control signal transmission circuit may be configured to change the bias potential to one of the high level and the low level in a fourth period that is set on the basis of the first video synchronization signal so as to output a completion signal indicating a completion timing of the control signal to the signal line. The signal-processing circuit may be configured to determine the completion signal by determining a change of the bias potential in the fourth period.

According to a ninth aspect of the present invention, in the eighth aspect, the video signal may be read from the image sensor in the first period, the third period, and the fourth period. The second period may be a blanking period of the first video synchronization signal and a blanking period of the second video synchronization signal.

According to a tenth aspect of the present invention, in any one of the first to ninth aspects, the signal-processing circuit may be configured to determine the imaging condition from the control signal in a period during which the video signal is output from the image sensor. After the video signal is read from the image sensor, the signal-processing circuit may be configured to write the imaging condition on the resistor in a blanking period of the second video synchronization signal.

According to an eleventh aspect of the present invention, in the first aspect, the control signal transmission circuit may be configured to transmit the control signal to which an error-correction code is added. The signal-processing circuit may be configured to determine the imaging condition from the control signal and write the imaging condition indicated by the control signal determined to be correctly transmitted on the basis of the error-correction code on the register.

DETAILED DESCRIPTION OF THE INVENTION

Hereinafter, embodiments of the present invention will be described with reference to the drawings. Each of the embodiments will be described in detail by using an endoscopic imaging system as an example of an imaging system.

First Embodiment

Figure 1:
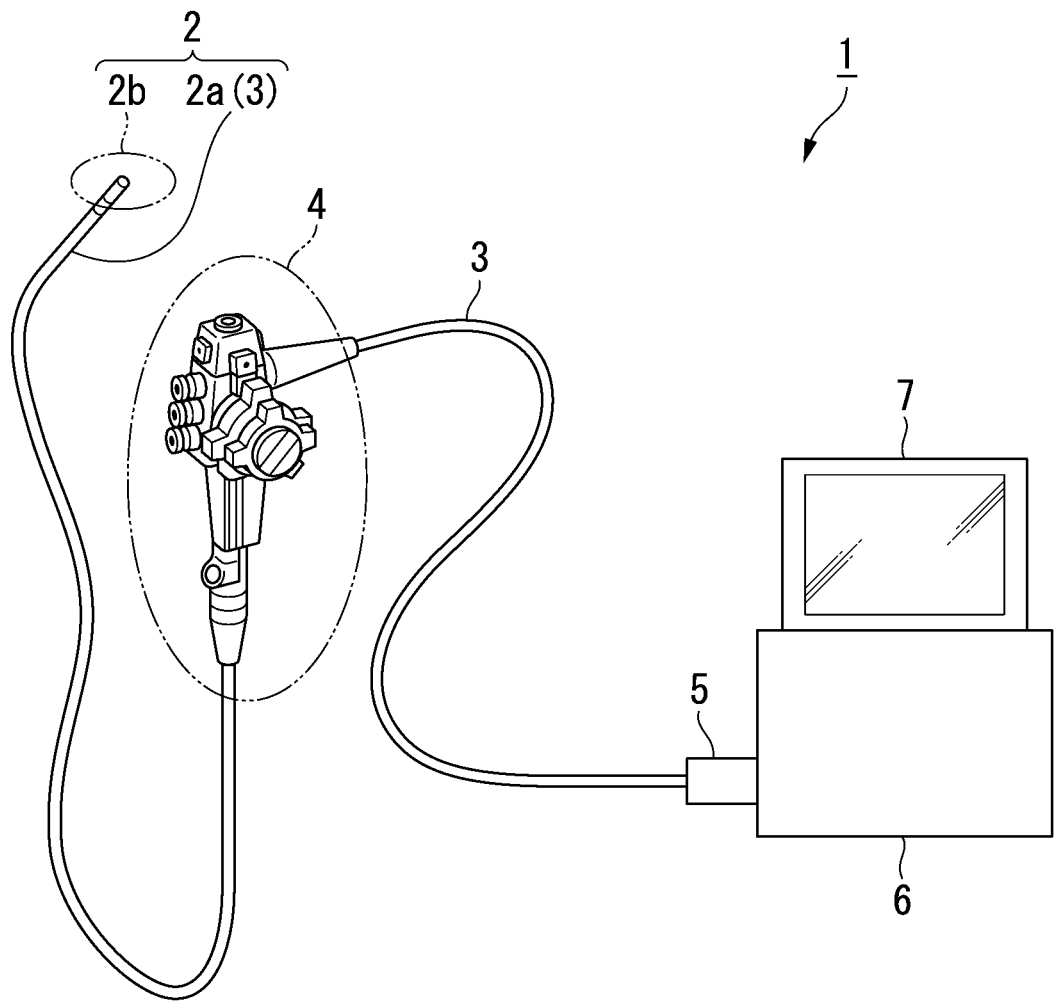
FIG. 1 is a schematic diagram showing a configuration of an endoscopic imaging system according to a first embodiment of the present invention.

FIG. 1 shows a configuration of an endoscopic imaging system 1 according to a first embodiment of the present invention. The endoscopic imaging system 1 shown in FIG. 1 includes an endoscope insertion unit 2, a transmission cable 3, an operation unit 4, a connector unit 5, a processor 6, and a display device 7. The endoscope insertion unit 2, the transmission cable 3, the operation unit 4, and the connector unit 5 constitute a scope.

Figure 2:
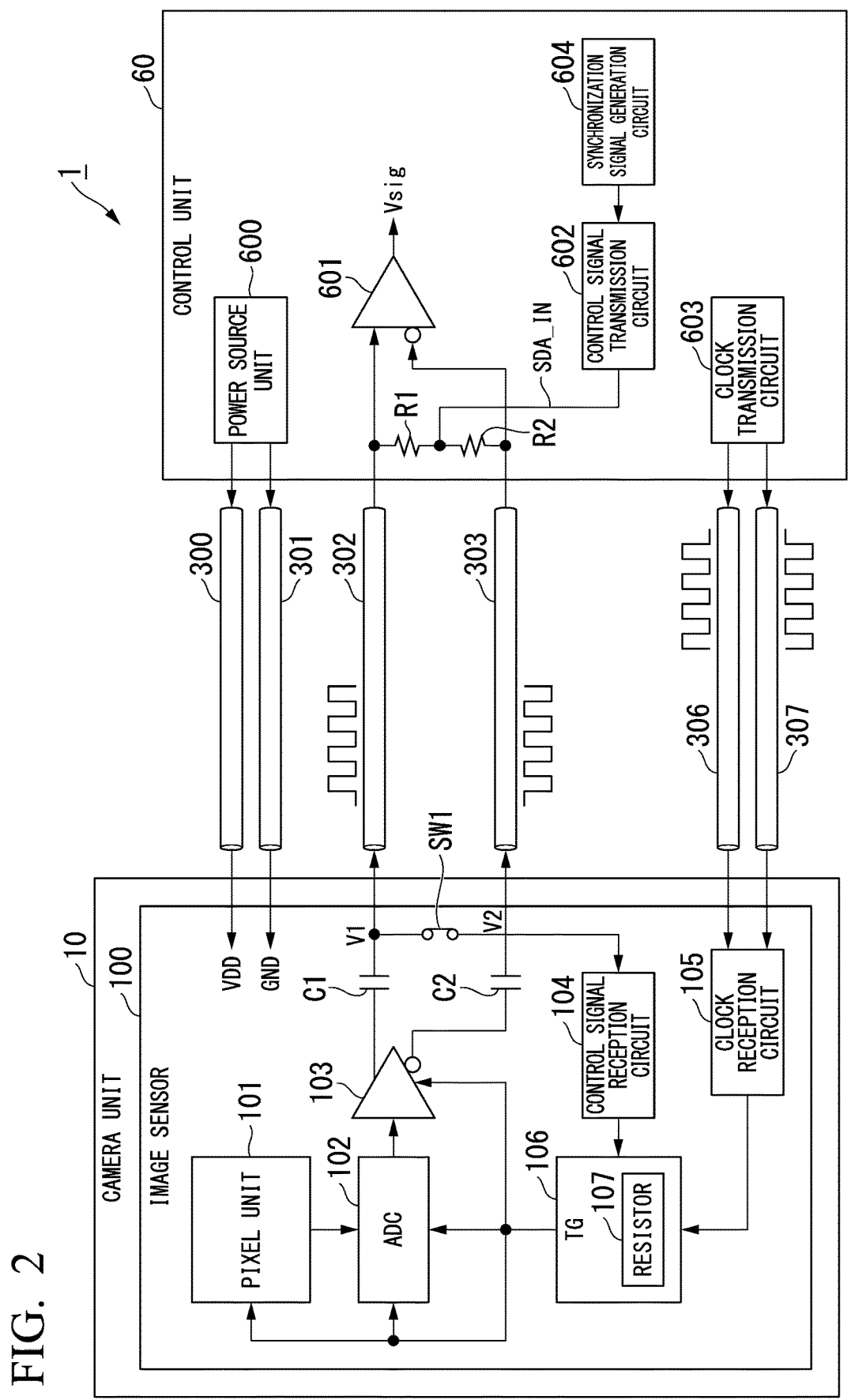
FIG. 2 is a block diagram showing a configuration of the endoscopic imaging system according to the first embodiment of the present invention.

The endoscope insertion unit 2 includes an insertion unit 2a. The insertion unit 2a is part of the transmission cable 3. The insertion unit 2a is to be inserted into the inside of a subject. The endoscope insertion unit 2 generates a video signal (image data) by imaging the inside of the subject. The endoscope insertion unit 2 outputs the generated video signal to the processor 6. A camera unit 10 shown in FIG. 2 is disposed in a distal end 2b of the insertion unit 2a. In the insertion unit 2a, the operation unit 4 is connected to the end part opposite the distal end 2b. The operation unit 4 accepts various operations for the endoscope insertion unit 2 from a user.

The transmission cable 3 connects the camera unit 10 and the connector unit 5 together. The video signal generated by the camera unit 10 is output to the connector unit 5 via the transmission cable 3.

The connector unit 5 is connected to the endoscope insertion unit 2 and the processor 6. The connector unit 5 performs predetermined processing on the video signal output from the endoscope insertion unit 2. The connector unit 5 outputs the video signal to the processor 6.

The processor 6 performs image-processing on the video signal output from the connector unit 5. Furthermore, the processor 6 centrally controls the entire endoscopic imaging system 1.

The display device 7 displays an image on the basis of the video signal processed by the processor 6. In addition, the display device 7 displays various kinds of information related to the endoscopic imaging system 1.

The endoscopic imaging system 1 includes a light source device that generates illumination light emitted to the subject. The light source device is not shown in FIG. 1.

FIG. 2 shows an internal configuration of the endoscopic imaging system 1. The endoscopic imaging system 1 shown in FIG. 2 includes the camera unit 10 and a control unit 60. The camera unit 10 is disposed in the distal end 2b of the endoscope. The control unit 60 corresponds to the processor 6. The operation unit 4, the connector unit 5, and the display device 7 are not shown in FIG. 2.

The camera unit 10 includes an image sensor 100 (imager). The image sensor 100 includes a pixel unit 101, an AD conversion circuit (ADC) 102, a video signal transmission circuit 103, a control signal reception circuit 104 (signal-processing circuit), a clock reception circuit 105, and a timing generator (TG) 106. The control unit 60 includes a power source unit 600, a video signal reception circuit 601, a control signal transmission circuit 602, a clock transmission circuit 603, and a synchronization signal generation circuit 604.

All or some of the ADC 102, the video signal transmission circuit 103, the control signal reception circuit 104, the clock reception circuit 105, and the TG 106 may be disposed in a different chip from that in which the image sensor 100 is disposed. All or some of the circuits included in the control unit 60 may be disposed in the operation unit 4 or the connector unit 5.

The camera unit 10 and the control unit 60 are connected to each other by a cable 300, a cable 301, a cable 302, a cable 303, a cable 306, and a cable 307. Each of the cables includes a signal line and is disposed inside the transmission cable 3.

A schematic configuration of the endoscopic imaging system 1 will be described. The image sensor 100 performs imaging in accordance with an imaging condition stored on the register 107 in the TG 106 and outputs a video signal to the cable 302 and the cable 303. The video signal reception circuit 601 receives the video signal that is output to the cable 302 and the cable 303 and is superimposed on a bias potential of the cable 302 and a bias potential of the cable 303. The control signal transmission circuit 602 sets the bias potential of the cable 302 to one of two or more different potentials at a timing that is set on the basis of a first video synchronization signal. In this way, the control signal transmission circuit 602 outputs a control signal indicating an imaging condition of the image sensor 100 to the cable 302. The first video synchronization signal is synchronized with a second video synchronization signal indicating a timing at which the video signal is output from the image sensor 100. The control signal reception circuit 104 receives the control signal output to the cable 302. The control signal reception circuit 104 determines the imaging condition from the control signal by determining the bias potential at a tuning that is set on the basis of the second video synchronization signal. The register 107 in the TG 106 stores the imaging condition determined by the control signal reception circuit 104.

A detailed configuration of the endoscopic imaging system 1 will be described. The power source unit 600 outputs a power source voltage VDD to the cable 300 and outputs a ground voltage GND to the cable 301. The cable 300 transmits the power source voltage VDD to the image sensor 100, and the cable 301 transmits the ground voltage GND to the image sensor 100.

The pixel unit 101 includes a plurality of pixels disposed in a matrix shape. The pixel unit 101 generates a pixel signal. The ADC 102 converts the analog pixel signal into a digital video signal. The video signal transmission circuit 103 transmits the video signal to the control unit 60 by outputting the video signal to the cable 302 and the cable 303. The video signal is a differential signal including a first video signal and a second video signal different from each other. The cable 302 (first signal line) transmits the first video signal to the control unit 60. The cable 303 (second signal line) transmits the second video signal to the control unit 60.

The video signal reception circuit 601 receives the video signal transmitted by the video signal transmission circuit 103. The video signal reception circuit 601 converts the differential signal into a single-ended signal. The video signal reception circuit 601 outputs a video signal Vsig generated by converting the differential signal into the single-ended signal.

The image sensor 100 includes a capacitance element C1 and a capacitance element C2. Each of the capacitance element C1 and the capacitance element C2 includes a first terminal and a second terminal. The first terminal of each of the capacitance element C1 and the capacitance element C2 is connected to the video signal transmission circuit 103. The second terminal of the capacitance element C1 is connected to the cable 302. The second terminal of the capacitance element C2 is connected to the cable 303.

The first video signal output from the video signal transmission circuit 103 is input to the cable 302 via the capacitance element C1. The second video signal output from the video signal transmission circuit 103 is input to the cable 303 via the capacitance element C2. The common-mode level in the video signal transmission circuit 103 is cut off by the capacitance element C1 and the capacitance element C2, and only a video signal having a high frequency is output to the cable 302 and the cable 303.

The TG 106 generates the second video synchronization signal including a horizontal synchronization signal and a vertical synchronization signal. The second video synchronization signal indicates a timing at which the video signal is output from the image sensor 100 and a timing at which output of the video signal is stopped. The TG 106 outputs the second video synchronization signal to the pixel unit 101, the ADC 102, and the video signal transmission circuit 103. The TG 106 includes the register 107. The register 107 stores data indicating the imaging condition of the image sensor 100. The imaging condition of the image sensor 100 is expressed as a timing at which the potential of the second video synchronization signal changes. The TG 106 generates the second video synchronization signal on the basis of the data stored on the register 107.

The pixel unit 101 generates the pixel signal at the timing indicated by the second video synchronization signal. The pixel unit 101 stops generation of the pixel signal in a blanking period of the second video synchronization signal. The ADC 102 performs AD conversion at the timing indicated by the second video synchronization signal and generates the video signal. The ADC 102 stops the AD conversion in the blanking period of the second video synchronization signal. The video signal transmission circuit 103 outputs the video signal to the cable 302 and the cable 303 at the timing indicated by the second video synchronization signal. The video signal transmission circuit 103 stops transmission of the video signal in the blanking period of the second video synchronization signal.

The synchronization signal generation circuit 604 generates the first video synchronization signal. The first video synchronization signal includes a horizontal synchronization signal and a vertical synchronization signal. For example, the second video synchronization signal generated by the TG 106 is embedded in the video signal by using Manchester coding. The video signal is transmitted from the camera unit 10 to the control unit 60. The synchronization signal generation circuit 604 includes a clock-and-data recovery (CDR) circuit. The synchronization signal generation circuit 604 reproduces the second video synchronization signal from the video signal by using the CDR circuit. The synchronization signal generation circuit 604 outputs the reproduced second video synchronization signal as the first video synchronization signal to the control signal transmission circuit 602.

The synchronization signal generation circuit 604 may be a similar circuit to the TG 106. The endoscopic imaging system 1 may include a means for synchronizing the first video synchronization signal generated by the synchronization signal generation circuit 604 and the second video synchronization signal generated by the TG 106 with each other.

The control signal transmission circuit 602 sets the potential of a control signal SDA_IN to a predetermined potential at a timing indicated by the first video synchronization signal. In this way, the control signal transmission circuit 602 outputs the control signal SDA_IN indicating the imaging condition of the image sensor 100 to the cable 302 and the cable 303. The control signal transmission circuit 602 transmits the control signal SDA_IN to the image sensor 100.

A resistor R1 and a resistor R2 are connected in series to each other between the cable 302 and the cable 303. Each of the resistor R1 and the resistor R2 includes a first terminal and a second terminal. The first terminal of the resistor R1 is connected to the cable 302. The first terminal of the resistor R2 is connected to the cable 303. The second terminal of the resistor R1 and the second terminal of the resistor R2 are connected to each other. The control signal SDA_IN output from the control signal transmission circuit 602 is input to the second terminal of the resistor R1 and the second terminal of the resistor R2.

The control signal SDA_IN is output to the cable 302 via the resistor R1 and is output to the cable 303 via the resistor R2. The control signal SDA_IN is the DC bias potential of the cable 302 and the cable 303. The cable 302 and the cable 303 transmit the control signal to the image sensor 100.

The image sensor 100 includes a switch SW1. The switch SW1 includes a first terminal and a second terminal. The first terminal of the switch SW1 is connected to the cable 302. The second terminal of the switch SW1 is connected to the control signal reception circuit 104.

The state of the switch SW1 is the ON state in the blanking period of the second video synchronization signal. At this time, the control signal reception circuit 104 is electrically connected to the cable 302, and the control signal is input to the control signal reception circuit 104. The control signal reception circuit 104 receives the control signal output to the cable 302. The state of the switch SW1 is the OFF state in a video transmission period of the second video synchronization signal. At this time, the control signal reception circuit 104 is electrically insulated from the cable 302. Therefore, any influence of the control signal reception circuit 104 on transmission of the video signal can be suppressed. A similar load to the switch SW1 may be connected to the cable 303 in order to realize impedance matching.

The control signal transmission circuit 602 outputs a first potential included in the two or more potentials to the cable 302 and outputs a second potential that is included in the two or more potentials and has the same phase as that of the first potential to the cable 303. In this way, the control signal transmission circuit 602 outputs the control signal to the cable 302 and the cable 303. The control signal reception circuit 104 determines the imaging condition from the control signal by determining at least one of the first potential and the second potential. In the example shown in FIG. 2, the control signal reception circuit 104 determines the first potential output to the cable 302. The control signal reception circuit 104 may determine the second potential output to the cable 303. The control signal reception circuit 104 may determine the first potential and the second potential.

The control signal reception circuit 104 determines the imaging condition of the image sensor 100 from the control signal by using the vertical synchronization signal included in the second video synchronization signal instead of the SCL. The control signal reception circuit 104 generates data indicating the imaging condition of the image sensor 100 and writes the data on the register 107. The register 107 stores the data generated by the control signal reception circuit 104.

The clock transmission circuit 603 transmits a clock signal to the image sensor 100 by outputting the clock signal to the cable 306 and the cable 307. The clock signal is transmitted as a differential signal. The cable 306 and the cable 307 transmit the clock signal to the image sensor 100. The clock reception circuit 105 receives the clock signal transmitted by the clock transmission circuit 603. The clock signal is a reference signal used for driving the image sensor 100. The clock reception circuit 105 converts the differential signal into a single-ended signal. The clock reception circuit 105 outputs the clock signal generated by converting the differential signal into the single-ended signal to the TG 106.

Figure 3:
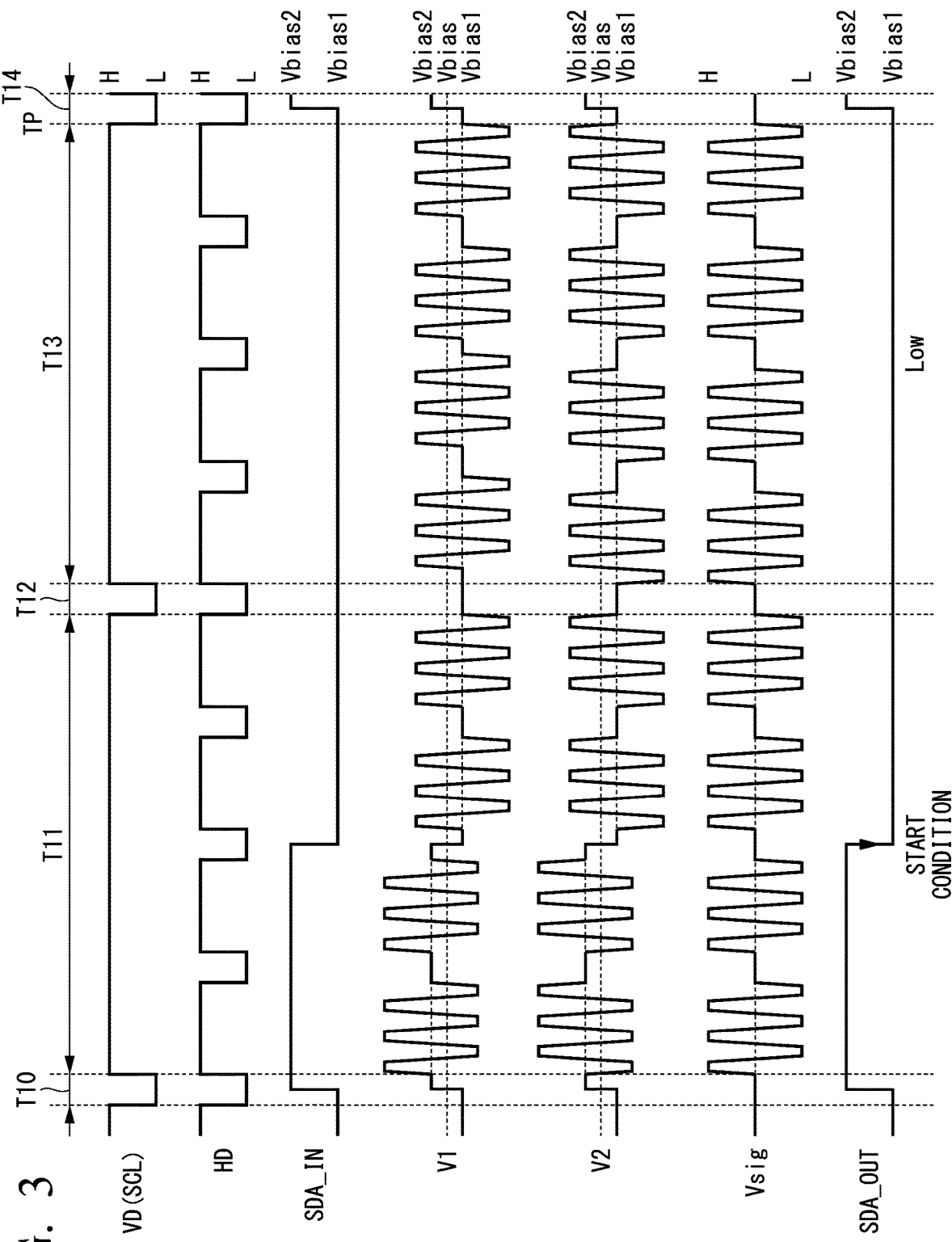
FIG. 3 is a timing chart showing waveforms of signals used in the endoscopic imaging system according to the first embodiment of the present invention.
Figure 4:
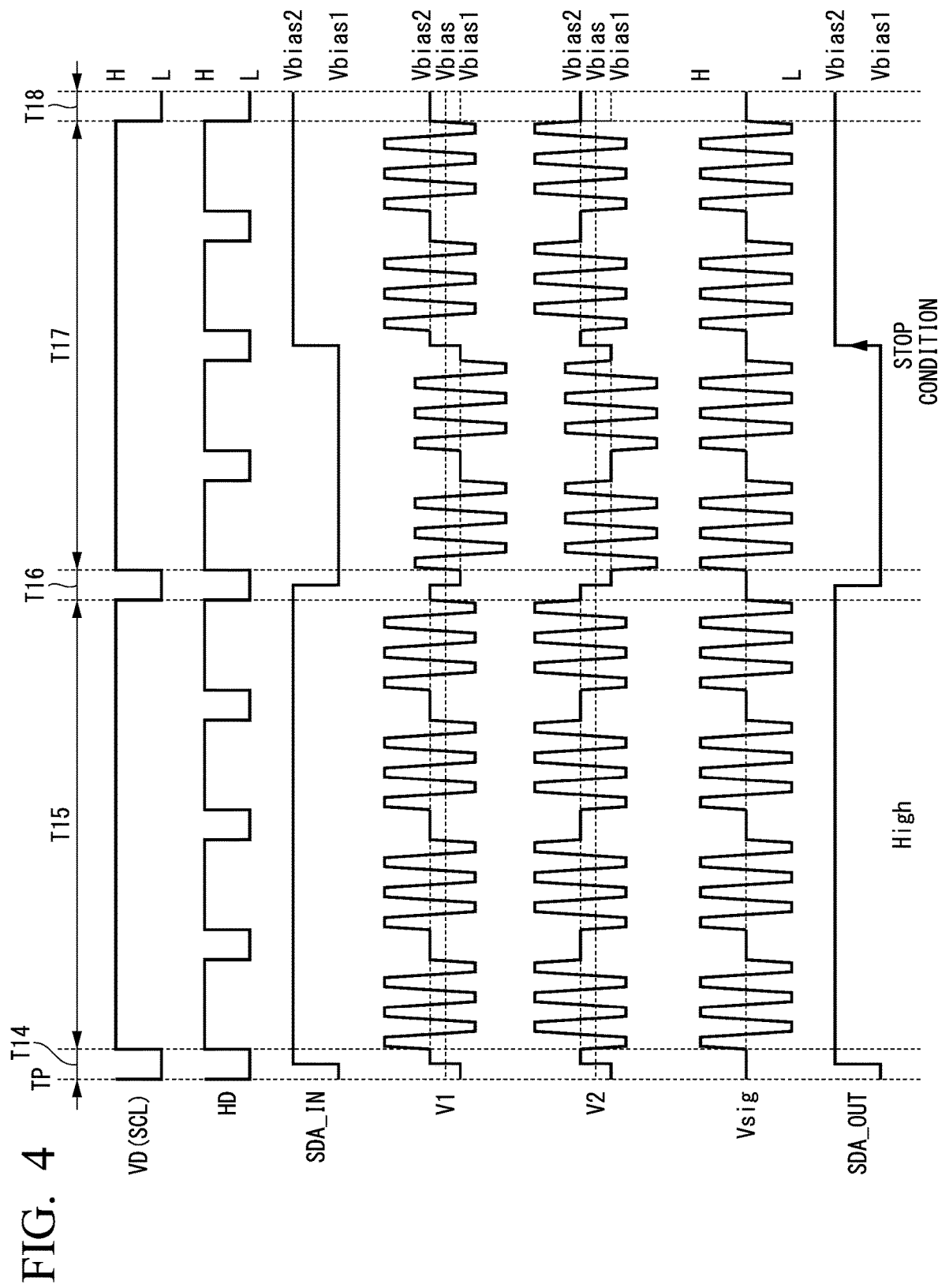
FIG. 4 is a timing chart showing waveforms of signals used in the endoscopic imaging system according to the first embodiment of the present invention.

An operation related to the control signal will be described by referring to FIG. 3 and FIG. 4. FIG. 3 and FIG. 4 show waveforms of signals used in the endoscopic imaging system 1. The horizontal direction in FIG. 3 and FIG. 4 indicates time, and the vertical direction in FIG. 3 and FIG. 4 indicates a potential (electric potential) of signals. A timing TP in FIG. 3 and a timing TP in FIG. 4 are the same. Waveforms of a vertical synchronization signal VD, a horizontal synchronization signal HD, the control signal SDA_IN, a potential V1, a potential V2, the video signal Vsig, and a signal SDA_OUT are shown in FIG. 3 and FIG. 4.

The vertical synchronization signal VD and the horizontal synchronization signal HD are included in the first video synchronization signal and the second video synchronization signal. Since the first video synchronization signal and the second video synchronization signal are synchronized with each other, only the vertical synchronization signal VD and the horizontal synchronization signal HD included in the first video synchronization signal are shown in the drawings and the vertical synchronization signal VD and the horizontal synchronization signal HD included in the second video synchronization signal are not shown in the drawings.

The vertical synchronization signal VD indicates a frame cycle of the video signal. The potential of the vertical synchronization signal VD is "High" or "Low." The vertical synchronization signal VD is used instead of the SCL. The horizontal synchronization signal HD corresponds to a row-cycle of the video signal. The potential of the horizontal synchronization signal HD is "High" or "Low." The length of a period during which the potential of the horizontal synchronization signal HD is "High" is shorter than that of a period during which the potential of the vertical synchronization signal VD is "High." The frequency of the horizontal synchronization signal HD is higher than that of the vertical synchronization signal VD. When the potential of the horizontal synchronization signal HD is "High," the image sensor 100 transmits the video signal to the control unit 60.

The control signal SDA_IN is output from the control signal transmission circuit 602. The potential of the control signal SDA_IN is Vbias1 or Vbias2. The potential Vbias2 is higher than the potential Vbias1. The potential Vbias1 corresponds to a low level. The potential Vbias2 corresponds to a high level. The potential V1 indicates the potential of the cable 302 connected to the second terminal of the capacitance element C1. The potential V2 indicates the potential of the cable 303 connected to the second terminal of the capacitance element C2. The video signal Vsig is output from the video signal reception circuit 601. The signal SDA_OUT indicates the bias potential determined by the control signal reception circuit 104.

The control signal transmission circuit 602 changes the potential of the control signal SDA_IN in the blanking period of the horizontal synchronization signal HD. In other words, when the potential of the horizontal synchronization signal HD is "Low," the control signal transmission circuit 602 changes the potential of the control signal SDA_IN. When the potential of the horizontal synchronization signal HD is "Low," the state of the switch SW1 is the ON state. When the potential of the horizontal synchronization signal HD is "High," the state of the switch SW1 is the OFF state. When the potential of the horizontal synchronization signal HD is "Low," the control signal reception circuit 104 receives the control signal.

The vertical synchronization signal VD is used instead of the SCL. If the edge of the signal SDA_OUT is determined while the potential of the vertical synchronization signal VD is "Low," a start condition or a stop condition is met. The control signal reception circuit 104 extracts the data indicating the imaging condition of the image sensor 100 from the control signal on the basis of the potential of the signal SDA_OUT between the timing at which the start condition is met and the timing at which the stop condition is met.

Before a period T10, the potential of the control signal SDA_IN is Vbias1. In the period T10, the potentials of the vertical synchronization signal VD and the horizontal synchronization signal HD are "Low." The control signal transmission circuit 602 sets the potential of the control signal SDA_IN to Vbias2 in the period T10. The potential of the control signal SDA_IN changes from Vbias1 to Vbias2. The control signal transmission circuit 602 outputs a bias potential in accordance with the potential Vbias2 to the cable 302 and the cable 303. Therefore, the potential V1 and the potential V2 increase in accordance with the potential Vbias2. The control signal reception circuit 104 determines the bias potential (signal SDA_OUT) output to the cable 302 on the basis of the potential V1.

In a period T11, the potential of the vertical synchronization signal VD is "High." When the potential of the horizontal synchronization signal HD is "High" in the period T11, the video signal transmission circuit 103 outputs the video signal to the cable 302 and the cable 303. The cable 302 and the cable 303 have a bias potential in accordance with the control signal output by the control signal transmission circuit 602. The video signal reception circuit 601 outputs the video signal Vsig from which the bias potential has been eliminated.

When the potential of the horizontal synchronization signal HD is "Low" in the period T11, the control signal transmission circuit 602 sets the potential of the control signal SDA_IN to Vbias1. The potential of the control signal SDA_IN changes from Vbias2 to Vbias1. A bias potential in accordance with the potential Vbias1 is output to the cable 302 and the cable 303. Therefore, the potential V1 and the potential V2 decrease in accordance with the potential Vbias1.

The potential of the vertical synchronization signal VD is "High" in the period T11, and the potential of the control signal SDA_IN changes from Vbias2 to Vbias1 in the period T11. The potential of the signal SDA_OUT changes similarly to that of the control signal SDA_IN. Accordingly, the start condition is met in the period T11. The control signal reception circuit 104 determines the start condition on the basis of the change of the potential of the signal SDA_OUT in the period T11.

In a period T12, the potential of the vertical synchronization signal VD and the potential of the horizontal synchronization signal HD are "low." The control signal transmission circuit 602 sets the potential of the control signal SDA_IN to Vbias1 in the period T12. The potential of the control signal SDA_IN does not change. Therefore, the potential V1 and the potential V2 do not change.

In a period T13, the potential of the vertical synchronization signal VD is "High." When the potential of the horizontal synchronization signal HD is "High" in the period T13, the video signal is transmitted as in the period T11. The control signal transmission circuit 602 keeps the potential of the control signal SDA_IN at Vbias1 in the period T13. The control signal reception circuit 104 determines data (Low) on the basis of the potential of the signal SDA_OUT in the period T13.

In a period T14, the potential of the vertical synchronization signal VD and the potential of the horizontal synchronization signal HD are "Low." The control signal transmission circuit 602 sets the potential of the control signal SDA_IN to Vbias2 in the period T14. The potential of the control signal SDA_IN changes from Vbias1 to Vbias2. The control signal transmission circuit 602 outputs a bias potential in accordance with the potential Vbias2 to the cable 302 and the cable 303. Therefore, the potential V1 and the potential V2 increase in accordance with the potential Vbias2.

In a period T15, the potential of the vertical synchronization signal VD is "High." When the potential of the horizontal synchronization signal HD is "High" in the period T15, the video signal is transmitted as in the period T11. The control signal transmission circuit 602 keeps the potential of the control signal SDA_IN at Vbias2 in the period T15. The control signal reception circuit 104 determines data (High) on the basis of the potential of the signal SDA_OUT in the period T15.

In a period T16, the potential of the vertical synchronization signal VD and the potential of the horizontal synchronization signal HD are "low." The control signal transmission circuit 602 sets the potential of the control signal SDA_IN to Vbias1 in the period T16. The potential of the control signal SDA_IN changes from Vbias2 to Vbias1. The control signal transmission circuit 602 outputs a bias potential in accordance with the potential Vbias1 to the cable 302 and the cable 303. Therefore, the potential V1 and the potential V2 decrease in accordance with the potential Vbias1.

In a period T17, the potential of the vertical synchronization signal VD is "High." When the potential of the horizontal synchronization signal HD is "High" in the period T17, the video signal is transmitted as in the period T11. When the potential of the horizontal synchronization signal HD is "Low" in the period T17, the control signal transmission circuit 602 sets the potential of the control signal SDA_IN to Vbias2. The potential of the control signal SDA_IN changes from Vbias1 to Vbias2. The control signal transmission circuit 602 outputs a bias potential in accordance with the potential Vbias2 to the cable 302 and the cable 303. Therefore, the potential V1 and the potential V2 increase in accordance with the potential Vbias2.

The potential of the vertical synchronization signal VD is "High" in the period T17, and the potential of the control signal SDA_IN changes from Vbias1 to Vbias2 in the period T17. The potential of the signal SDA_OUT changes similarly to that of the control signal SDA_IN. Accordingly, the stop condition is met in the period T17. The control signal reception circuit 104 determines the stop condition on the basis of the change of the potential of the signal SDA_OUT in the period T17.

In the example shown in FIG. 3 and FIG. 4, the control signal reception circuit 104 determines the data (Low) in the period T13 and determines the data (High) in the period T15. Accordingly, the control signal reception circuit 104 determines the data, which are the combination of "Low" and "High." After the stop condition is determined, the control signal reception circuit 104 writes the data indicating the imaging condition on the register 107 in a period T18 during which the potential of the vertical synchronization signal VD is "Low."

In the above-described operation, the control signal transmission circuit 602 sets the bias potential of the cable 302 to one of two or more potentials in the blanking period (T10, T12, T14, and T16) of the first video synchronization signal (VD). Specifically, the control signal transmission circuit 602 sets the bias potential to "High" in the period T10 and the period T14. The control signal transmission circuit 602 sets the bias potential to "Low" in the period T12 and the period T16.

In the above-described operation, the control signal transmission circuit 602 changes the bias potential to one of the high level (Vbias2) and the low level (Vbias1) included in the two or more potentials in a first period (T11) that is set on the basis of the first video synchronization signal (VD). In this way, the control signal transmission circuit 602 outputs a start signal (start condition) indicating a start timing of the control signal to the cable 302. The control signal reception circuit 104 determines the start signal (start condition) by determining a change of the bias potential in the first period (T11).

After the start signal is output to the cable 302, the control signal transmission circuit 602 sets the bias potential to one of the high level and the low level in one or more second periods (T12 and T14) that are set on the basis of the first video synchronization signal (VD). In this way, the control signal transmission circuit 602 outputs the control signal to the cable 302. The control signal reception circuit 104 determines the imaging condition from the control signal by determining the bias potential in a third period (T13 and T15) that is set on the basis of the second video synchronization signal.

After the control signal is output to the cable 302, the control signal transmission circuit 602 changes the bias potential to one of the high level (Vbias2) and the low level (Vbias1) in a fourth period (T17) that is set on the basis of the first video synchronization signal (VD). In this way, the control signal transmission circuit 602 outputs a completion signal (stop condition) indicating a completion timing of the control signal to the cable 302. The control signal reception circuit 104 determines the completion signal (stop condition) by determining a change of the bias potential in the fourth period (T17).

In the first period (T11), the third period (T13 and T15), and the fourth period (T17), the video signal is output from the image sensor 100. The second period (T12 and T14) is the blanking period of the first video synchronization signal and the second video synchronization signal.

In the above-described operation, the control signal reception circuit 104 determines the imaging condition from the control signal in the period (T13 and T15) during which the video signal is output from the image sensor 100. After the video signal is read from the image sensor 100, the control signal reception circuit 104 writes the imaging condition on the register 107 in the blanking period (T18) of the second video synchronization signal (VD).

In the above-described example, the bias potentials of the cable 302 and the cable 303 are set to one of two potentials. The bias potentials of the cable 302 and the cable 303 may be set to one of three or more different potentials. The control signal reception circuit 104 may determine the imaging condition from the control signal by determining one of the three or more potentials output to the cable 302.

In the above-described example, the vertical synchronization signal is used instead of the SCL. The horizontal synchronization signal may be used instead of the SCL. One or more cycles of the horizontal synchronization signal may correspond to one cycle of the SCL.

The first video synchronization signal and the second video synchronization signal do not need to be completely synchronized with each other. As long as the amount of shift between the phase of the first video synchronization signal and the phase of the second video synchronization signal is sufficiently shorter than the length of the blanking period, the amount of the shift is not necessarily zero.

In the first embodiment, the first video synchronization signal and the second video synchronization signal are used instead of the SCL. The control signal corresponding to the SDA is transmitted by the cable 302 used for transmitting the video signal. Therefore, a signal line used for transmitting the control signal does not need to be newly installed. The endoscopic imaging system 1 can update the imaging condition of the image sensor 100 stored on the register 107 and can reduce the number of signal lines.

The control unit 60 does not need to stop output of the video signal from the camera unit 10 in order to perform communication of the control signal. Since the video signal is transmitted as a differential signal, the video signal reception circuit 601 can eliminate noise mixed with the video signal passing through the cable 302 and the cable 303. Favorable communication of the video signal is performed in the endoscopic imaging system using a long cable.

The first video signal and the second video signal consisting of a differential signal have the same phase. The bias potential of the cable 302 and the bias potential of the cable 303 change in the same phase. When the bias potential of the cable 302 increases, the bias potential of the cable 303 increases. When the bias potential of the cable 302 decreases, the bias potential of the cable 303 decreases. Therefore, the video signal reception circuit 601 can easily eliminate the bias potentials of the cable 302 and the cable 303 from the video signal.

The control signal transmission circuit 602 sets the bias potentials of the cable 302 and the cable 303 in the blanking period of the horizontal synchronization signal. The video signal is not transmitted in the blanking period. Therefore, a change of the bias potential does not affect reception of the video signal.

The control signal reception circuit 104 determines the bias potential in the blanking period of the horizontal synchronization signal. The video signal is not transmitted in the blanking period. Therefore, the control signal reception circuit 104 can directly determine the bias potential.

The control signal reception circuit 104 writes the imaging condition of the image sensor 100 on the register 107 in the blanking period of the vertical synchronization signal. The data stored on the register 107 are not changed in the period during which the video signal is output from the image sensor 100. Therefore, it is possible to avoid the imaging condition being changed while the image sensor 100 outputs the video signal of one frame. In addition, since the imaging condition is transmitted through a change of the bias potentials of the cable 302 and the cable 303 in the first embodiment, a dedicated line used for transmitting the imaging condition can be omitted. Accordingly, it is possible to avoid an unintentional imaging condition being transmitted through a dedicated line from the outside and to avoid the imaging condition being written on the resistor, and therefore security is improved. This is suitable for purposes of a surveillance camera or the like.

(Modified Example of First Embodiment)

Figure 5:
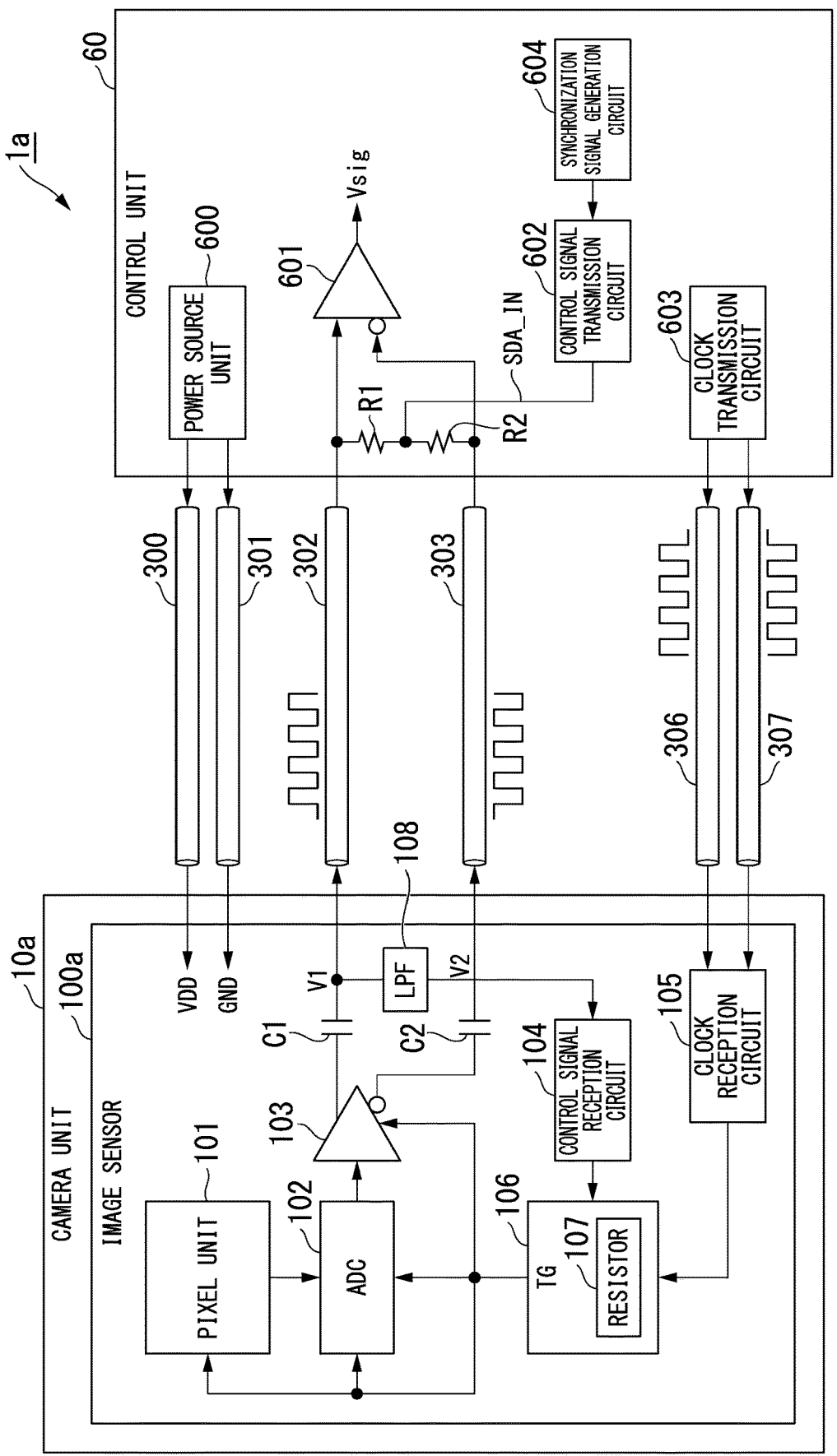
FIG. 5 is a block diagram showing a configuration of an endoscopic imaging system according to a modified example of the first embodiment of the present invention.

FIG. 5 shows an internal configuration of an endoscopic imaging system 1*a* according to a modified example of the first embodiment. The same parts as those shown in FIG. 2 will not be described.

The camera unit 10 shown in FIG. 2 is changed to a camera unit 10*a*. The image sensor 100 shown in FIG. 2 is changed to an image sensor 100*a*. The image sensor 100*a* includes a low-pass filter (LPF) 108 in addition to the configuration shown in FIG. 2. The LPF 108 includes a first terminal and a second terminal. The first terminal of the LPF 108 is connected to the cable 302. The second terminal of the LPF 108 is connected to the control signal reception circuit 104. A similar load to the LPF 108 may be connected to the cable 303 in order to realize impedance matching.

The control signal transmission circuit 602 changes the bias potentials of the cable 302 and the cable 303. The video signal has components having potentials that change at a higher frequency than that at which the bias potentials of the cable 302 and the cable 303 change. The length of a period during which the bias potentials are kept at one potential is longer than or equal to the cycle of the horizontal synchronization signal HD shown in FIG. 3 and FIG. 4. The length of a period during which the potential of the video signal is kept at one potential is shorter than the cycle of the horizontal synchronization signal HD. Therefore, the frequency of the video signal is higher than that of the bias potentials. The LPF 108 is electrically connected to the cable 302. The LPF 108 causes a signal having a low frequency to pass therethrough and eliminates a signal having a high frequency. The LPF 108 outputs a signal that has components of the bias potential and does not have components of the video signal to the control signal reception circuit 104.

In the modified example of the first embodiment, the control signal reception circuit 104 may determine the bias potential in a period during which the potential of the horizontal synchronization signal is "High." The image sensor 100 outputs the video signal in the period during which the potential of the horizontal synchronization signal is "High."

Second Embodiment

Figure 6:
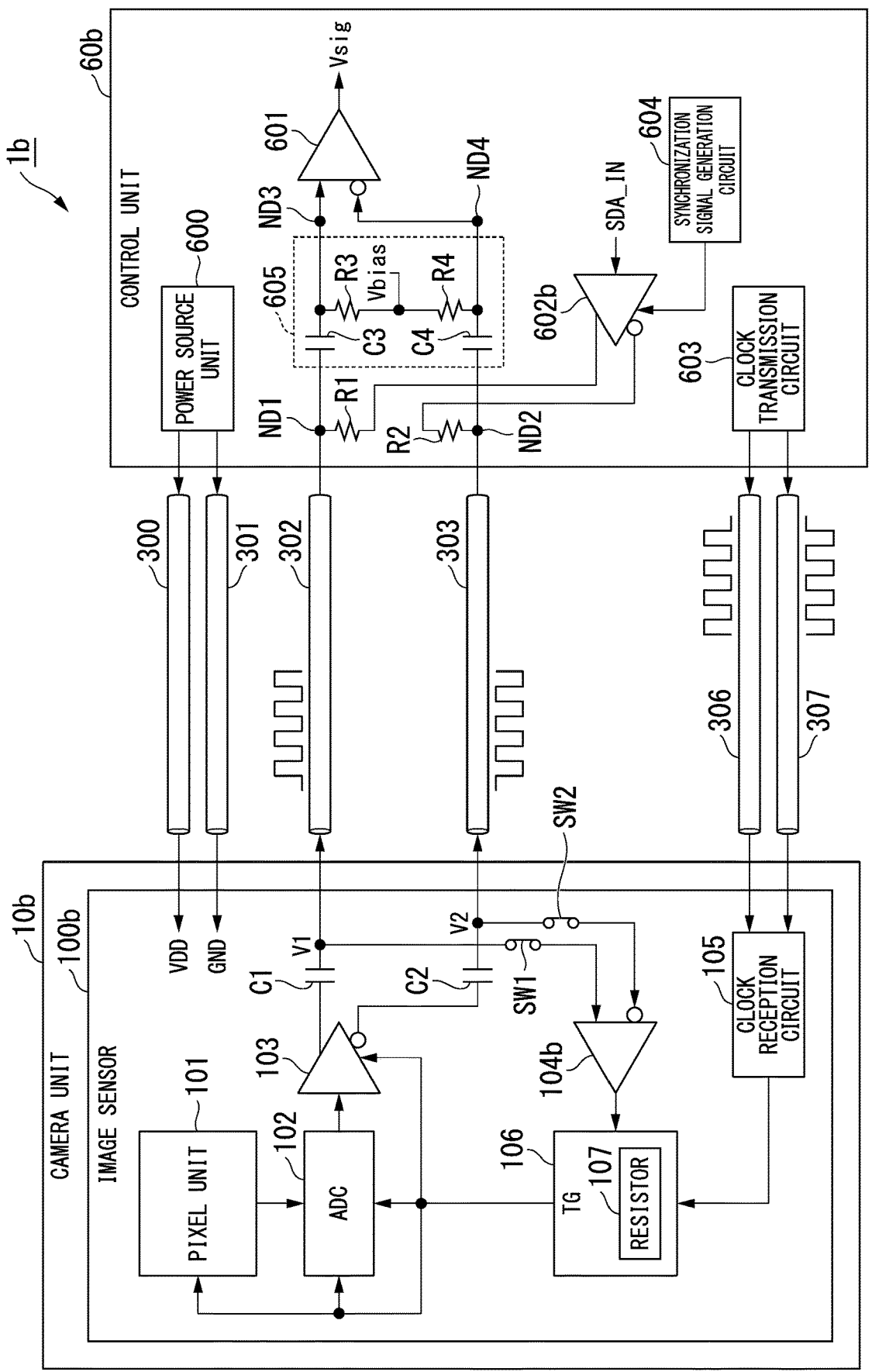
FIG. 6 is a block diagram showing a configuration of an endoscopic imaging system according to a second embodiment of the present invention.

FIG. 6 shows an internal configuration of an endoscopic imaging system 1*b* according to a second embodiment. The same parts as those shown in FIG. 2 will not be described.

The camera unit 10 shown in FIG. 2 is changed to a camera unit 10*b*. The image sensor 100 shown in FIG. 2 is changed to an image sensor 100*b*. The image sensor 100*b* includes a switch SW2 in addition to the configuration shown in FIG. 2. The control signal reception circuit 104 shown in FIG. 2 is changed to a control signal reception circuit 104*b*.

The control unit 60 shown in FIG. 2 is changed to a control unit 60*b*. The control unit 60*b* includes a high-pass filter 605 in addition to the configuration shown in FIG. 2. The control signal transmission circuit 602 shown in FIG. 2 is changed to a control signal transmission circuit 602*b*.

The control signal transmission circuit 602*b* is electrically connected to a node ND1 (first node) of a signal line passing through the cable 302 and a node ND2 (first node) of a signal line passing through the cable 303. The video signal reception circuit 601 is electrically connected to a node ND3 (second node) of the signal line passing through the cable 302 and a node ND4 (second node) of the signal line passing through the cable 303. The node ND1 and the node ND3 are different from each other, and the node ND2 and the node ND4 are different from each other. The node ND1 is positioned between the camera unit 100*b* and the node ND3, and the node ND2 is positioned between the camera unit 100*b* and the node ND4. The video signal has components having potentials that change at a higher frequency than that at which the bias potentials of the cable 302 and the cable 303 change. The high-pass filter 605 is electrically connected to a signal line between the node ND1 and the node ND3 and is electrically connected to a signal line between the node ND2 and the node ND4. The high-pass filter 605 outputs a signal that has components of the video signal and does not have components of the bias potentials to the video signal reception circuit 601.

The control signal transmission circuit 602*b* transmits the control signal to the image sensor 100*b* by outputting the control signal to the cable 302 and the cable 303. The control signal in the second embodiment is a differential signal including a first control signal and a second control signal different from each other. The control signal SDA_IN, which is a single-ended signal, is input to the control signal transmission circuit 602b. The potential of the control signal SDA_IN is set to a predetermined potential at a timing indicated by the first video synchronization signal. The control signal transmission circuit 602b outputs the first control signal having a potential in accordance with the potential of the control signal SDA_IN to the cable 302 and outputs the second control signal having a potential in accordance with the potential of the control signal SDA_IN to the cable 303.

The first terminal of the resistor R1 is connected to the node ND1. The first terminal of the resistor R2 is connected to the node ND2. The second terminal of the resistor R1 and the second terminal of the resistor R2 are connected to the control signal transmission circuit 602b. The first control signal output from the control signal transmission circuit 602b is input to the second terminal of the resistor R1. The second control signal output from the control signal transmission circuit 602b is input to the second terminal of the resistor R2.

The first control signal is output to the cable 302 through the resistor R1. The second control signal is output to the cable 303 through the resistor R2. The cable 302 transmits the first control signal to the image sensor 100b. The cable 303 transmits the second control signal to the image sensor 100b.

The switch SW1 is the same as the switch SW1 shown in FIG. 2. The switch SW2 includes a first terminal and a second terminal. The first terminal of the switch SW1 is connected to the cable 302, and the first terminal of the switch SW2 is connected to the cable 303. The second terminal of the switch SW1 and the second terminal of the switch SW2 are connected to the control signal reception circuit 104b.

The states of the switch SW1 and the switch SW2 are the ON state in the blanking period of the second video synchronization signal. At this time, the control signal reception circuit 104b is electrically connected to the cable 302 and the cable 303, and the control signal is input to the control signal reception circuit 104b. The control signal reception circuit 104b receives the first control signal output to the cable 302 and the second control signal output to the cable 303. The states of the switch SW1 and the switch SW2 are the OFF state in the video transmission period of the second video synchronization signal. At this time, the control signal reception circuit 104b is electrically insulated from the cable 302 and the cable 303. Therefore, any influence of the control signal reception circuit 104b on transmission of the video signal can be suppressed.

The control signal transmission circuit 602b outputs a first potential included in the two or more potentials to the cable 302 (first signal line). The control signal transmission circuit 602b outputs a second potential that is included in the two or more potentials and has a reverse phase (negative phase) to the phase (positive phase) of the first potential to the cable 303 (second signal line). In this way, the control signal transmission circuit 602b outputs the control signal to the cable 302 and the cable 303. The control signal reception circuit 104b determines the imaging condition from the control signal by determining the first potential and the second potential.

The high-pass filter 605 includes a resistor R3, a resistor R4, a capacitance element C3, and a capacitance element C4. Each of the resistor R3, the resistor R4, the capacitance element C3, and the capacitance element C4 includes a first terminal and a second terminal.

The first terminal of the capacitance element C3 is connected to the node ND1. The second terminal of the capacitance element C3 is connected to the node ND3. The first terminal of the capacitance element C4 is connected to the node ND2. The second terminal of the capacitance element C4 is connected to the node ND4.

The first terminal of the resistor R3 is connected to the second terminal of the capacitance element C3 and the node ND3. The first terminal of the resistor R4 is connected to the second terminal of the capacitance element C4 and the node ND4. The second terminal of the resistor R3 and the second terminal of the resistor R4 are connected to each other. A common-mode voltage Vbias of the cable 302 and the cable 303 is input to the second terminal of the resistor R3 and the second terminal of the resistor R4.

The high-pass filter 605 has a cut-off frequency in accordance with the resistance value of each of the resistor R3 and the resistor R4 and the capacitance value of each of the capacitance element C3 and the capacitance element C4. The control signal transmission circuit 602b changes the bias potentials of the cable 302 and the cable 303. The frequency of the video signal is higher than that of each of the bias potentials of the cable 302 and the cable 303. The high-pass filter 605 causes a signal having a high frequency to pass therethrough and eliminates a signal having a low frequency. The high-pass filter 605 outputs a signal that has components of the video signal and does not have components of the bias potential to the video signal reception circuit 601.

Figure 7:
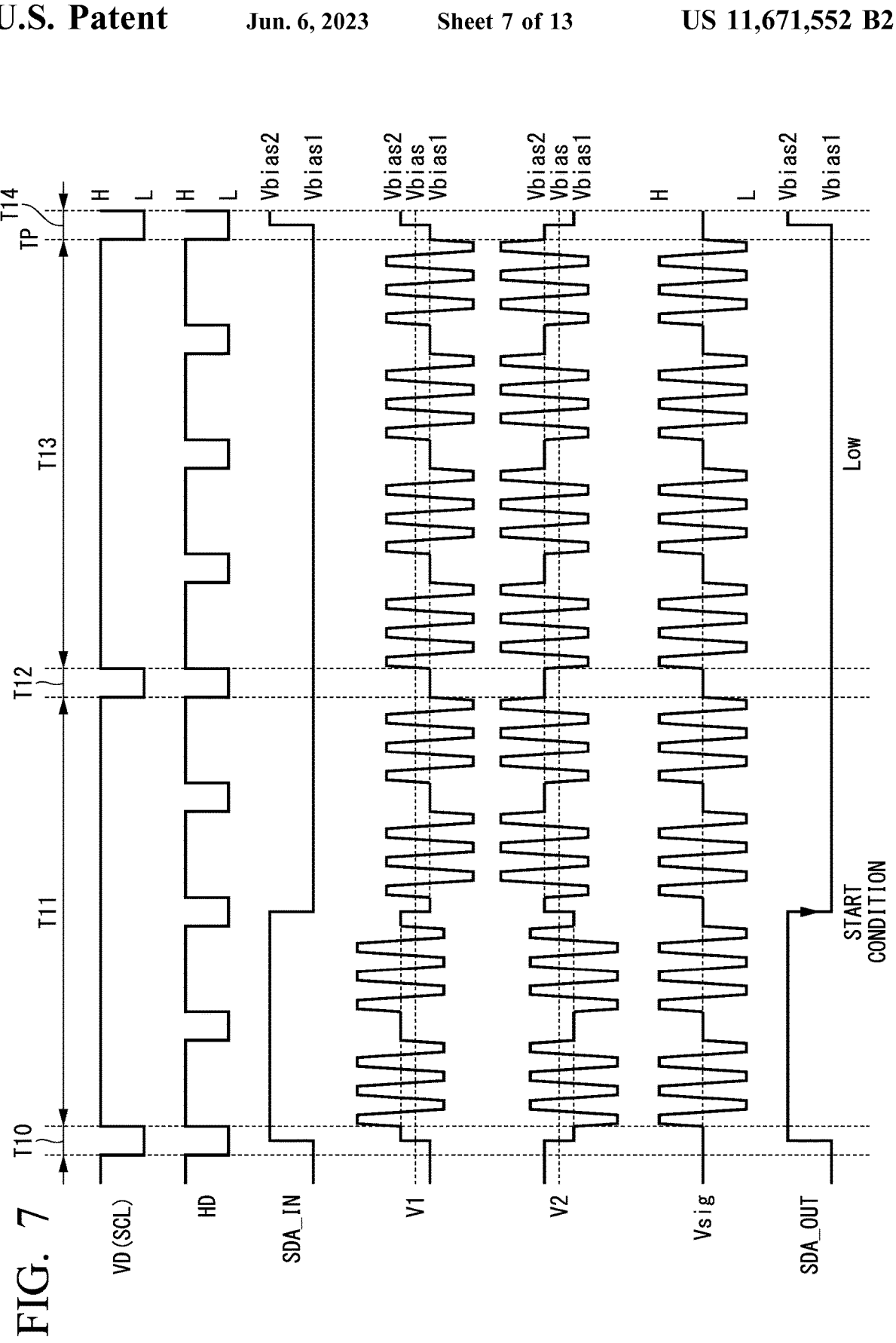
FIG. 7 is a timing chart showing waveforms of signals used in the endoscopic imaging system according to the second embodiment of the present invention.
Figure 8:
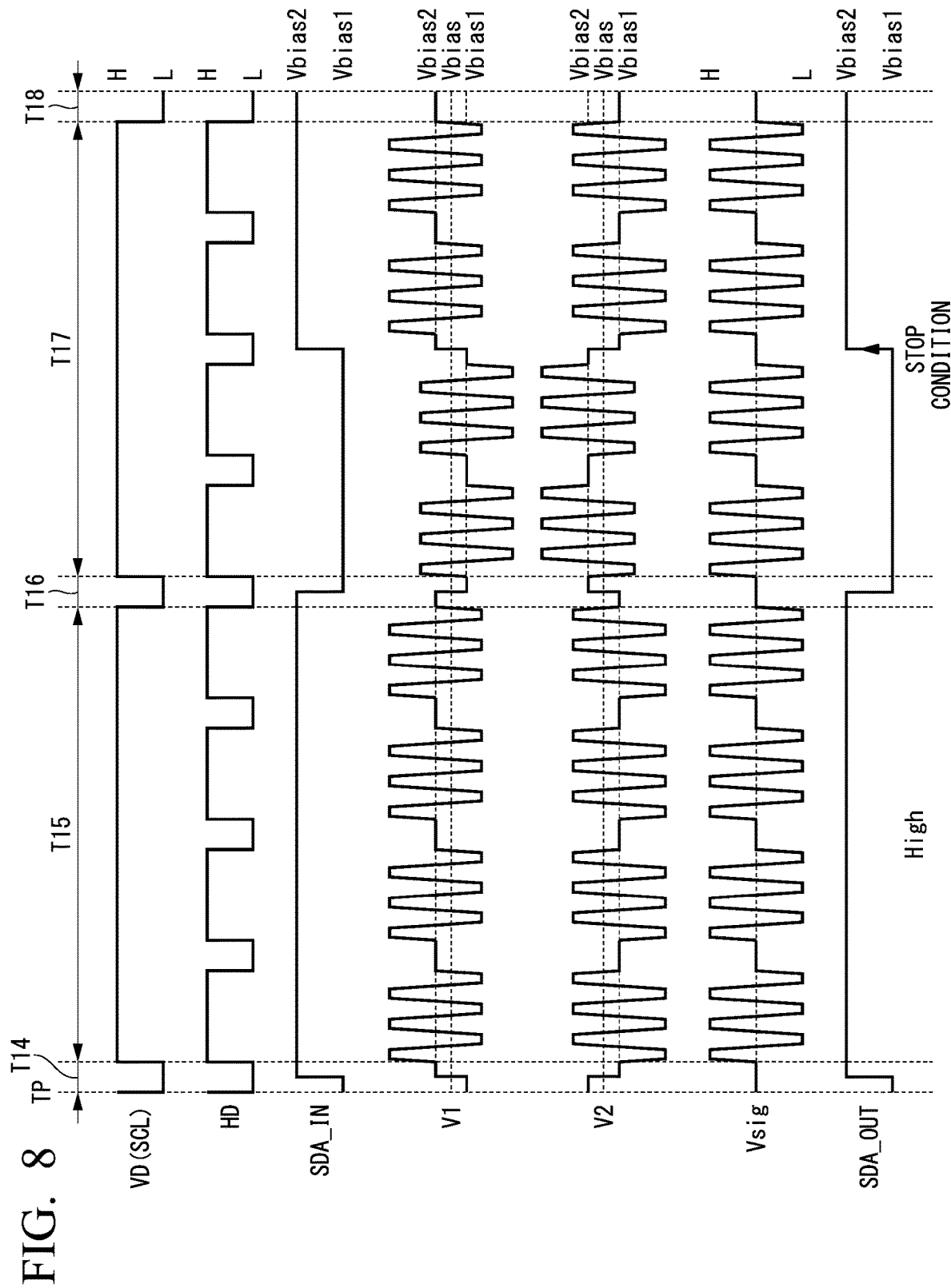
FIG. 8 is a tuning chart showing waveforms of signals used in the endoscopic imaging system according to the second embodiment of the present invention.

An operation related to the control signal will be described by referring to FIG. 7 and FIG. 8. FIG. 7 and FIG. 8 show waveforms of signals used in the endoscopic imaging system 1b. The horizontal direction in FIG. 7 and FIG. 8 indicates time, and the vertical direction in FIG. 7 and FIG. 8 indicates a potential (electric potential) of signals. A timing TP in FIG. 7 and a timing TP in FIG. 8 are the same. Waveforms of the vertical synchronization signal VD, the horizontal synchronization signal HD, the control signal SDA_IN, the potential V1, the potential V2, the video signal Vsig, and the signal SDA_OUT are shown in FIG. 7 and FIG. 8. The same parts as those shown in FIG. 3 and FIG. 4 will not be described.

The potential of the control signal SDA_IN input to the control signal transmission circuit 602b changes in the blanking period of the horizontal synchronization signal HD. In other words, when the potential of the horizontal synchronization signal HD is "Low," the potential of the control signal SDA_IN input to the control signal transmission circuit 602b changes. When the potential of the horizontal synchronization signal HD is "Low," the states of the switch SW1 and the switch SW2 are the ON state. When the potential of the horizontal synchronization signal HD is "High," the states of the switch SW1 and the switch SW2 are the OFF state. When the potential of the horizontal synchronization signal HD is "Low," the control signal reception circuit 104b receives the control signal.

In a period T10, the potentials of the vertical synchronization signal VD and the horizontal synchronization signal HD are "Low." The potential of the control signal SDA_IN input to the control signal transmission circuit 602b is set to Vbias2 in the period T10. The potential of the control signal SDA_IN changes from Vbias1 to Vbias2. The control signal transmission circuit 602b outputs a bias potential in accordance with the potential Vbias2 to the cable 302 and the cable 303. The phase of the potential of the cable 303 is reverse to that of the potential of the cable 302. Therefore, the potential V1 increases, and the potential V2 decreases.

The control signal reception circuit 104b determines the bias potential (signal SDA_OUT) on the basis of the potential V1 and the potential V2. The signal SDA_OUT corresponds to the control signal SDA_IN input to the control signal transmission circuit 602b.

In a period T11, the potential of the vertical synchronization signal VD is "High." When the potential of the horizontal synchronization signal HD is "High" in the period T11, the video signal transmission circuit 103 outputs the video signal to the cable 302 and the cable 303. The cable 302 and the cable 303 have a bias potential in accordance with the control signal output by the control signal transmission circuit 602b. The high-pass filter 605 outputs the video signal from which the bias potential has been eliminated to the video signal reception circuit 601. The video signal reception circuit 601 outputs the video signal Vsig.

When the potential of the horizontal synchronization signal HD is "Low" in the period T11, the potential of the control signal SDA_IN input to the control signal transmission circuit 602b is set to Vbias 1. The potential of the control signal SDA_IN changes from Vbias2 to Vbias1. The control signal transmission circuit 602b outputs a bias potential in accordance with the potential Vbias1 to the cable 302 and the cable 303. The potential V1 decreases, and the potential V2 increases. The control signal reception circuit 104b determines the bias potential on the basis of the potential V1 and the potential V2.

The potential of the vertical synchronization signal VD is "High" in the period T11, and the potential of the control signal SDA_IN input to the control signal transmission circuit 602b changes from Vbias2 to Vbias1 in the period T11. The potential of the signal SDA_OUT changes similarly to that of the control signal SDA_IN. Accordingly, the start condition is met in the period T11. The control signal reception circuit 104b determines the start condition on the basis of the change of the potential of the signal SDA_OUT in the period T11.

In a period T12, the potential of the vertical synchronization signal VD and the potential of the horizontal synchronization signal HD are "low." The potential of the control signal SDA_IN input to the control signal transmission circuit 602b is set to Vbias1 in the period T12. The potential of the control signal SDA_IN does not change. Therefore, the potential V1 and the potential V2 do not change.

In a period T13, the potential of the vertical synchronization signal VD is "High." When the potential of the horizontal synchronization signal HD is "High" in the period T13, the video signal is transmitted as in the period T11. The potential of the control signal SDA_IN input to the control signal transmission circuit 602b is kept at Vbias1 in the period T13. The control signal reception circuit 104b determines data (Low) on the basis of the potential of the signal SDA_OUT in the period T13.

In a period T14, the potential of the vertical synchronization signal VD and the potential of the horizontal synchronization signal HD are "Low." The potential of the control signal SDA_IN input to the control signal transmission circuit 602b is set to Vbias2 in the period T14. The potential of the control signal SDA_IN changes from Vbias1 to Vbias2. The control signal transmission circuit 602b outputs a bias potential in accordance with the potential Vbias2 to the cable 302 and the cable 303. Therefore, the potential V1 increases, and the potential V2 decreases.

In a period T15, the potential of the vertical synchronization signal VD is "High." When the potential of the horizontal synchronization signal HD is "High" in the period T15, the video signal is transmitted as in the period T11. The potential of the control signal SDA_IN input to the control signal transmission circuit 602b is kept at Vbias2 in the period T15. The control signal reception circuit 104b determines data (High) on the basis of the potential of the signal SDA_OUT in the period T15.

In a period T16, the potential of the vertical synchronization signal VD and the potential of the horizontal synchronization signal HD are "low." The potential of the control signal SDA_IN input to the control signal transmission circuit 602b is set to Vbias1 in the period T16. The potential of the control signal SDA_IN changes from Vbias2 to Vbias1. The control signal transmission circuit 602b outputs a bias potential in accordance with the potential Vbias1 to the cable 302 and the cable 303. Therefore, the potential V1 decreases, and the potential V2 increases.

In a period T17, the potential of the vertical synchronization signal VD is "High." When the potential of the horizontal synchronization signal HD is "High" in the period T17, the video signal is transmitted as in the period T11. When the potential of the horizontal synchronization signal HD is "Low" in the period T17, the potential of the control signal SDA_IN input to the control signal transmission circuit 602b is set to Vbias2. The potential of the control signal SDA_IN changes from Vbias1 to Vbias2. The control signal transmission circuit 602b outputs a bias potential in accordance with the potential Vbias2 to the cable 302 and the cable 303. Therefore, the potential V1 increases, and the potential V2 decreases.

The potential of the vertical synchronization signal VD is "High" in the period T17, and the potential of the control signal SDA_IN input to the control signal transmission circuit 602b changes from Vbias1 to Vbias2 in the period T17. The potential of the signal SDA_OUT changes similarly to that of the control signal SDA_IN. Accordingly, the stop condition is met in the period T17. The control signal reception circuit 104b determines the stop condition on the basis of the change of the potential of the signal SDA_OUT in the period T17.

In the example shown in FIG. 7 and FIG. 8, the control signal reception circuit 104b determines the data (Low) in the period T13 and determines the data (High) in the period T15. Accordingly, the control signal reception circuit 104b determines the data, which are the combination of "Low" and "High." After the stop condition is determined, the control signal reception circuit 104b writes the data indicating the imaging condition on the register 107 in a period T18 during which the potential of the vertical synchronization signal VD is "Low." Furthermore, the control signal transmission circuit 602b can add an error-correction code using a checksum, parity check, or the like in addition to the data indicating the imaging condition to the control signal SDA_IN. In this case, the control signal reception circuit 104b can check whether or not a register-control signal is correctly transmitted by using the error-correction code and can write only the correctly transmitted data of the imaging condition on the register.

In the second embodiment, since the control signal is transmitted as a differential signal, the control signal reception circuit 104b can eliminate noise mixed with the control signal passing through the cable 302 and the cable 303. Favorable communication of the video signal is performed in the endoscopic imaging system using a long cable.

The first video signal and the second video signal consisting of a differential signal have phases reverse to each other. The bias potential of the cable 302 and the bias potential of the cable 303 change in phases reverse to each other. When the bias potential of the cable 302 increases, the bias potential of the cable 303 decreases. When the bias potential of the cable 302 decreases, the bias potential of the cable 303 increases. The high-pass filter 605 outputs a signal that has components of the video signal and does not have components of the bias potentials to the video signal reception circuit 601. Therefore, the video signal reception circuit 601 can receive only the video signal.

(Modified Example of Second Embodiment)

Figure 9:
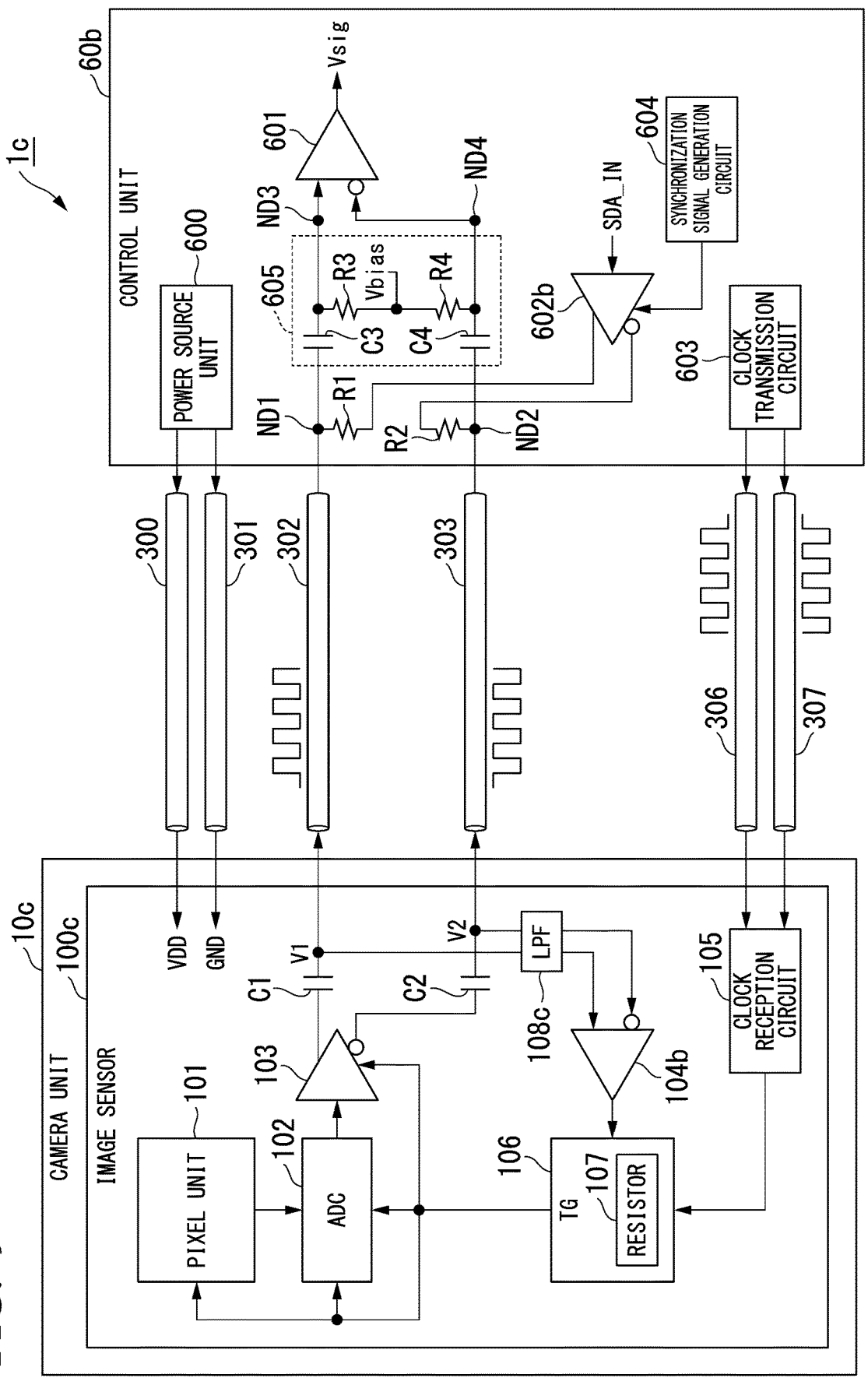
FIG. 9 is a block diagram showing a configuration of an endoscopic imaging system according to a modified example of the second embodiment of the present invention.

FIG. 9 shows an internal configuration of an endoscopic imaging system 1c according to a modified example of the second embodiment. The same parts as those shown in FIG. 6 will not be described.

The camera unit 10b shown in FIG. 6 is changed to a camera unit 10c. The image sensor 100b shown in FIG. 6 is changed to an image sensor 100c. The image sensor 100c includes a low-pass filter (LPF) 108c in addition to the configuration shown in FIG. 6. The LPF 108c includes a first terminal, a second terminal, a third terminal, and a fourth terminal. The first terminal of the LPF 108c is connected to the cable 302, and the second terminal of the LPF 108c is connected to the cable 303. The third terminal and the fourth terminal of the LPF 108c are connected to the control signal reception circuit 104b.

The control signal transmission circuit 602b changes the bias potentials of the cable 302 and the cable 303. The video signal has components having potentials that change at a higher frequency than that at which the bias potentials of the cable 302 and the cable 303 change. The LPF 108c is electrically connected to the cable 302 and the cable 303. The LPF 108c causes a signal having a low frequency to pass therethrough and eliminates a signal having a high frequency. The LPF 108c outputs a signal that has components of the bias potential and does not have components of the video signal to the control signal reception circuit 104b.

In the modified example of the second embodiment, the control signal reception circuit 104b may determine the bias potential in a period during which the potential of the horizontal synchronization signal is "High." The image sensor 100c outputs the video signal in the period during which the potential of the horizontal synchronization signal is "High."

Third Embodiment

Figure 10:
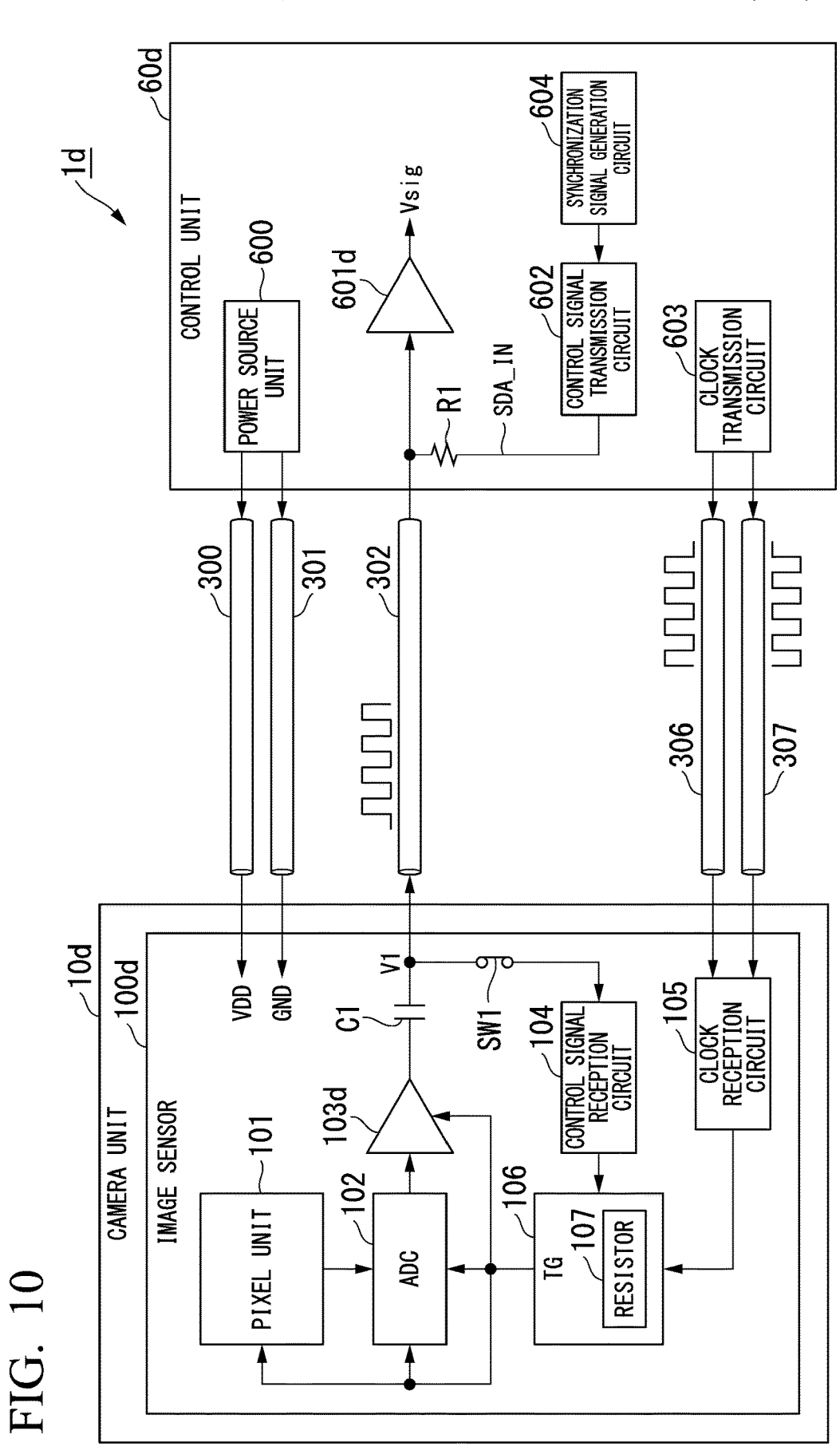
FIG. 10 is a block diagram showing a configuration of an endoscopic imaging system according to a third embodiment of the present invention.

FIG. 10 shows an internal configuration of an endoscopic imaging system 1d according to a third embodiment. The same parts as those shown in FIG. 2 will not be described.

The camera unit 10 shown in FIG. 2 is changed to a camera unit 10d. The image sensor 100 shown in FIG. 2 is changed to an image sensor 100d. The video signal transmission circuit 103 shown in FIG. 2 is changed to a video signal transmission circuit 103d.

The control unit 60 shown in FIG. 2 is changed to a control unit 60d. The video signal reception circuit 601 shown in FIG. 2 is changed to a video signal reception circuit 601d. The cable 303 shown in FIG. 2 is not disposed.

The video signal transmission circuit 103d transmits a video signal, which is a single-ended signal, to the control unit 60d by outputting the video signal to the cable 302. The video signal reception circuit 601d receives the video signal transmitted by the video signal transmission circuit 103d. The video signal reception circuit 601d outputs the received video signal Vsig. The operation related to transmission and reception of the control signal is the same as that in the first embodiment.

In the third embodiment, the number of cables is reduced compared to the first embodiment.

(Modified Example of Third Embodiment)

Figure 11:
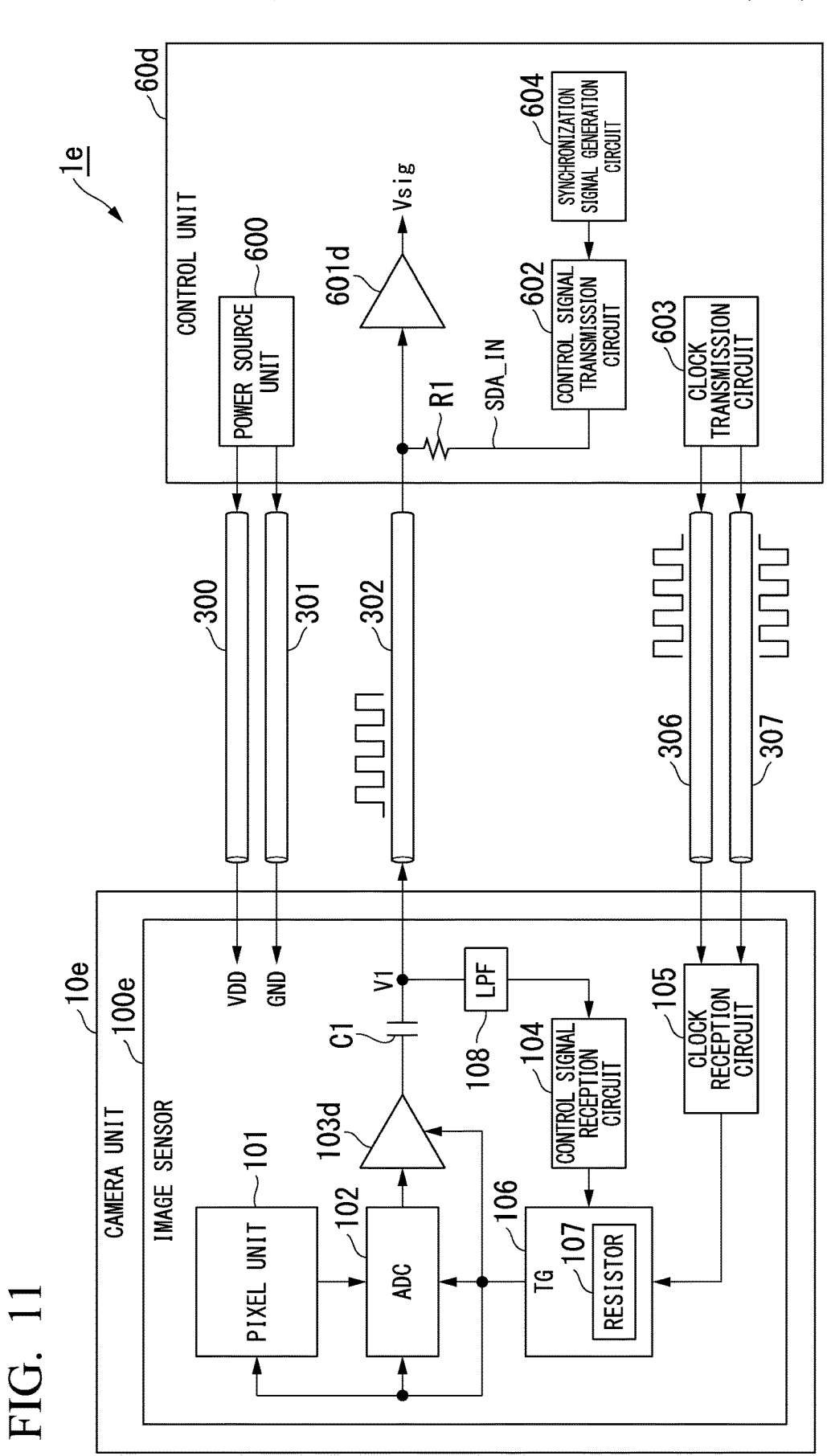
FIG. 11 is a block diagram showing a configuration of an endoscopic imaging system according to a modified example of the third embodiment of the present invention.
Figure 12:
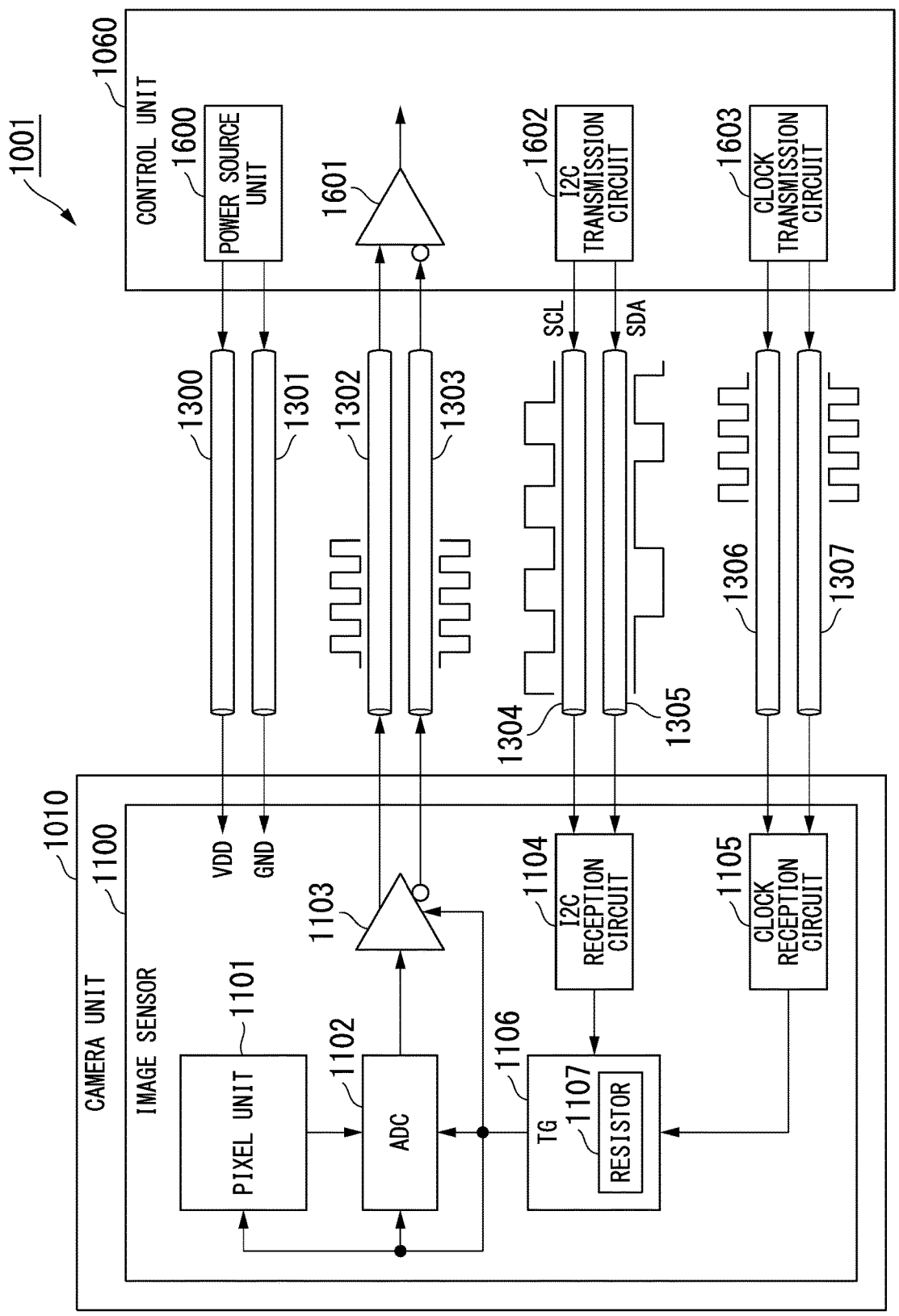
FIG. 12 is a block diagram showing an example of a configuration of an endoscopic imaging system of the related art.
Figure 13:
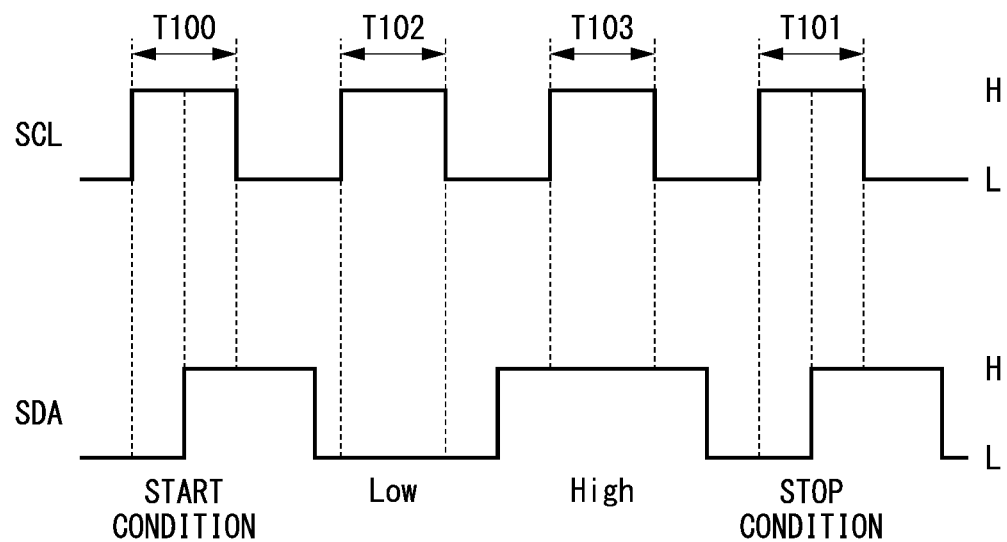
FIG. 13 is a timing chart showing waveforms of signals used in I2C communication of the related art.

FIG. 11 shows an internal configuration of an endoscopic imaging system 1e according to a modified example of the third embodiment. The same parts as those shown in FIG. 10 will not be described.

The camera unit 10d shown in FIG. 10 is changed to a camera unit 10e. The image sensor 100d shown in FIG. 10 is changed to an image sensor 100e. The image sensor 100e includes an LPF 108 in addition to the configuration shown in FIG. 10. The LPF 108 is the same as the LPF 108 shown in FIG. 5.

In the modified example of the third embodiment, the control signal reception circuit 104 may determine the bias potential in a period during which the potential of the horizontal synchronization signal is "High." The image sensor 100e outputs the video signal in the period during which the potential of the horizontal synchronization signal is "High."

While preferred embodiments of the invention have been described and shown above, it should be understood that these are examples of the invention and are not to be considered as limiting. Additions, omissions, substitutions, and other modifications can be made without departing from the spirit or scope of the present invention.

Accordingly, the invention is not to be considered as being limited by the foregoing description, and is only limited by the scope of the appended claims.

What is claimed is:

1. An imaging system, comprising:
   a camera unit comprising an image sensor; and
   a control unit connected to the camera unit by a signal line,
   wherein the control unit is configured to generate a first video synchronization signal,
   wherein the camera unit is configured to generate a second video synchronization signal that is synchronized with the first video synchronization signal and indicates a timing at which a video signal is output from the image sensor,
   wherein the control unit comprises:
      a video signal reception circuit configured to receive the video signal superimposed on a bias potential of the signal line; and
      a control signal transmission circuit configured to set the bias potential to one of two or more different potentials at a timing that is set on the basis of the first video synchronization signal so as to output a control signal indicating an imaging condition of the image sensor to the signal line,
   wherein the camera unit comprises:
      a signal-processing circuit configured to receive the control signal output to the signal line and determine the imaging condition from the control signal by determining the bias potential at a timing that is set on the basis of the second video synchronization signal;
      a register configured to store the imaging condition determined by the signal-processing circuit; and
      the image sensor configured to perform imaging in accordance with the imaging condition stored on the register and output the video signal to the signal line.

2. The imaging system according to claim 1,
   wherein the video signal is a differential signal including a first video signal and a second video signal different from each other, and wherein the signal line comprises:
   a first signal line used for transmitting the first video signal; and
   a second signal line used for transmitting the second video signal.

3. The imaging system according to claim 2,
wherein the control signal transmission circuit is configured to output a first potential included in the two or more potentials to the first signal line and output a second potential that is included in the two or more potentials and has the same phase as the phase of the first potential to the second signal line so as to output the control signal to the signal line, and
wherein the signal-processing circuit is configured to determine the imaging condition from the control signal by determining at least one of the first potential and the second potential.

4. The imaging system according to claim 2,
wherein the control signal transmission circuit is configured to output a first potential included in the two or more potentials to the first signal line and output a second potential that is included in the two or more potentials and has a reverse phase to a phase of the first potential to the second signal line so as to output the control signal to the signal line, and
wherein the signal-processing circuit is configured to determine the imaging condition from the control signal by determining the first potential and the second potential.

5. The imaging system according to claim 4,
wherein the control signal transmission circuit is electrically connected to a first node of the signal line,
wherein the video signal reception circuit is electrically connected to a second node of the signal line,
wherein the first node and the second node are different from each other and the first node is positioned between the camera unit and the second node,
wherein the video signal has components having potentials that change at a higher frequency than a frequency at which the bias potential changes, and
wherein the control unit further comprises a high-pass filter that is electrically connected to the signal line between the first node and the second node and is configured to output a signal that has components of the video signal and does not have components of the bias potential to the video signal reception circuit.

6. The imaging system according to claim 1,
wherein the control signal transmission circuit is configured to set the bias potential to one of the two or more potentials in a blanking period of the first video synchronization signal.

7. The imaging system according to claim 1,
wherein the video signal has components having potentials that change at a higher frequency than a frequency at which the bias potential changes, and
wherein the camera unit further comprises a low-pass filter that is electrically connected to the signal line and is configured to output a signal that has components of the bias potential and does not have components of the video signal to the signal-processing circuit.

8. The imaging system according to claim 1,
wherein the control signal transmission circuit is configured to change the bias potential to one of a high level and a low level included in the two or more potentials in a first period that is set on the basis of the first video synchronization signal so as to output a start signal indicating a start timing of the control signal to the signal line,
wherein the signal-processing circuit is configured to determine the start signal by determining a change of the bias potential in the first period,
wherein, after the start signal is output to the signal line, the control signal transmission circuit is configured to set the bias potential to one of the high level and the low level in one or more second periods that are set on the basis of the first video synchronization signal so as to output the control signal to the signal line,
wherein the signal-processing circuit is configured to determine the imaging condition from the control signal by determining the bias potential in a third period that is set on the basis of the second video synchronization signal,
wherein, after the control signal is output to the signal line, the control signal transmission circuit is configured to change the bias potential to one of the high level and the low level in a fourth period that is set on the basis of the first video synchronization signal so as to output a completion signal indicating a completion timing of the control signal to the signal line, and
wherein the signal-processing circuit is configured to determine the completion signal by determining a change of the bias potential in the fourth period.

9. The imaging system according to claim 8,
wherein the video signal is read from the image sensor in the first period, the third period, and the fourth period, and
wherein the second period is a blanking period of the first video synchronization signal and a blanking period of the second video synchronization signal.

10. The imaging system according to claim 1,
wherein the signal-processing circuit is configured to determine the imaging condition from the control signal in a period during which the video signal is output from the image sensor, and
wherein, after the video signal is read from the image sensor, the signal-processing circuit is configured to write the imaging condition on the resistor in a blanking period of the second video synchronization signal.

11. The imaging system according to claim 1,
wherein the control signal transmission circuit is configured to transmit the control signal to which an error-correction code is added, and
wherein the signal-processing circuit is configured to determine the imaging condition from the control signal and write the imaging condition indicated by the control signal determined to be correctly transmitted on the basis of the error-correction code on the register.

* * * * *